(12) United States Patent
Rawashdeh-Omary et al.

(10) Patent No.: US 12,291,606 B2
(45) Date of Patent: May 6, 2025

(54) COORDINATION POLYMERS OF COINAGE METALS SYNTHESIS AND USES THEREOF

(71) Applicant: Texas Woman's University, Denton, TX (US)

(72) Inventors: Manal A. Rawashdeh-Omary, Denton, TX (US); Ruaa M. Almotawa, Denton, TX (US); Mohammad A. Omary, Denton, TX (US)

(73) Assignee: TEXAS WOMAN'S UNIVERSITY, Denton, TX (US)

( * ) Notice: Subject to any disclaimer, the term of this patent is extended or adjusted under 35 U.S.C. 154(b) by 1010 days.

(21) Appl. No.: 17/058,764

(22) PCT Filed: Jul. 9, 2019

(86) PCT No.: PCT/US2019/040925
§ 371 (c)(1),
(2) Date: Nov. 25, 2020

(87) PCT Pub. No.: WO2020/014176
PCT Pub. Date: Jan. 16, 2020

(65) Prior Publication Data
US 2021/0214508 A1    Jul. 15, 2021

Related U.S. Application Data

(60) Provisional application No. 62/695,919, filed on Jul. 10, 2018.

(51) Int. Cl.
*C08G 83/00* (2006.01)
*C07F 1/08* (2006.01)
*C07F 1/10* (2006.01)
*C07F 1/12* (2006.01)

(52) U.S. Cl.
CPC .............. *C08G 83/001* (2013.01); *C07F 1/08* (2013.01); *C07F 1/10* (2013.01); *C07F 1/12* (2013.01)

(58) Field of Classification Search
CPC . C08G 83/001; C07F 1/08; C07F 1/10; C07F 1/12; C07D 213/22; C07D 213/53; G02F 2001/1515; G02F 1/15; C09K 9/00; H01H 2219/002
See application file for complete search history.

(56) References Cited

U.S. PATENT DOCUMENTS

2007/0267959 A1* 11/2007 Ragini ................ C07F 15/0046
                                                                  546/10
2010/0282080 A1    11/2010 Omary et al.
2014/0148596 A1*  5/2014 Dichtel .................... B01J 20/22
                                                                  540/472
2016/0064773 A1    3/2016 Choi et al.

OTHER PUBLICATIONS

Hu et al. (Acta Cryst. (2013). C69, 356-359).*
(Continued)

*Primary Examiner* — Shane Fang
(74) *Attorney, Agent, or Firm* — Kowert, Hood, Munyon, Rankin & Goetzel, P.C.; Gareth M. Sampson

(57) ABSTRACT

The embodiments described herein pertains to a new design method to produce copper, silver or gold based metal functional coordination polymers with excellent potential towards optoelectronic devices, gas storage and separation, optical sensors, and other applications.

9 Claims, 19 Drawing Sheets

(56) References Cited

OTHER PUBLICATIONS

Wang et al. (Chinese J. Struct. Chem., vol. 33, No. 5729-734).*
Trujillo et al. (Inorg. Chem. 2018, 57, 9962-9976).*
Dias et al. (Journal of Fluorine Chemistry 103 (2000) 163-169).*
Suzuki, T. et al., "Structural Investigation of a Flexible MOF (Cu(BF4)2 (1,3-bis(4-pyridyl) propane)2], Showing Selective Gate Adsorption with Dynamic Pore-Opening/Pore-Closing Processes"; The Journal of Physical Chemistry C; vol. 120, No. 38; 2016; 5 pgs.
Jomeh, G., "Synthesis and Spectroscopic Properties of Group 11 Coordination Polymers with Mixed Pyrazolate/Diimine Ligands"; Thesis; Department of Chemistry and Biochemistry College of Arts and Sciences, Texas Woman's University; Aug. 2015; 103 pgs.
Rabe, GW, et al., "Di-u-chloro-bis[chloro[hydrotris(pyrazol-1-yl)-borato)](tetrahydrofuran)ytterbium(III)] toluene solvate", Acta Crystallographica, Section E; vol. E62; 2006; pp. m3149-m3151.
Almotawa, et al., "Synthesis and Characterization of Cu(I) and Ag(I) Complexes with Mixed Diphosphine and Diimine Ligands"; Department of Chemistry and Biochemistry, Texas Woman's University; Apr. 2017; 1 pg.
Galassi, R., et al., "Cupriphication of Gold to Sensitize d10-d10 metal-metal bonds and near-unity phosphorescence Quantum Yields"; Proceedings of the National Academy of Sciences of the United States of America; vol. 114, No. 26; Jun. 2017; pp. E5042-E5051.
International Search Report and Written Opinion; International Application No. PCT/US2019/040925; mailed Sep. 3, 2019; 13 pgs.

* cited by examiner

−0.10 a.u. ▬▬▬▬ +0.10 a.u.

Scheme 1. Synthesis of poly-(PAP₃{[3,5-(CF₃)₂Pz]Cu}₂)-.

(a)

(b)

Scheme 2

Scheme 3. Chemical transformations carried out in this work for complexes 1-3.

Scheme 4. Chemical transformations carried out in this work for complexes 4 and 5.

Scheme 5. Chemical transformations carried out in this work for complex 6.

COORDINATION POLYMERS OF COINAGE METALS SYNTHESIS AND USES THEREOF

STATEMENT REGARDING FEDERALLY SPONSORED RESEARCH OR DEVELOPMENT

This invention was made with government support under CHE-1413641 awarded by the National Science Foundation. The government has certain rights in the invention.

BACKGROUND OF THE INVENTION

1. Field of the Invention

The invention generally relates to coordination polymers.

2. Description of the Relevant Art

A coordination polymer is an inorganic or organometallic polymer structure containing metal cation centers linked by organic ligands. Coordination polymers are useful in a number of different applications. Some of the applications the coordination polymers are being investigated for include: optoelectronic devices (e.g., solar photovoltaic cells), molecular storage and separation applications, luminescence, electrical conductivity, magnetism, and in sensor devices.

Each application that uses a coordination polymer has its own unique requirements for the function of the coordination polymer. Ideally, the coordination polymer can be tailored to the specific use. It is therefore desirable to be able to easily create coordination polymers having different physical and chemical properties.

SUMMARY OF THE INVENTION

The embodiments described herein pertain to a new design method to produce transition and lanthanide based metal functional coordination polymers with excellent potential towards optoelectronic devices, gas storage and separation, optical sensors, and other applications. Specifically, the novel coordination compounds include transition metal and lanthanide metal coordination polymers that include at least one transition/lanthanide metal atom and at least one neutral bridging electron-donor organic ligand and/or a negatively-charged counterion. Preferably, the metal is selected from the group consisting of copper, silver and gold. The coordination polymer may, in some embodiments include an anionic ligand and/or an anionic counterion.

Specific examples of coordination polymers include coordination polymer having the structures (I)-(IV) as described herein.

The coordination polymers described herein may be used as: (1) an active component in an organic optoelectronic device; (2) a passive component in an organic optoelectronic device; (3) an active component in a metal-organic optoelectronic device; (4) a passive component in a metal-organic optoelectronic device; (5) an active component in a hybrid organic/inorganic optoelectronic device; (6) a passive component in a hybrid organic/inorganic optoelectronic device; (7) a solid-state battery material; (8) a capacitor material; (9) an optical sensor; (10) a porous solid for gas storage; (11) a porous solid for gas separation; (12) a porous solid for hazard removal; (13) a heterogeneous catalyst; and (14) a homogeneous catalyst.

BRIEF DESCRIPTION OF THE DRAWINGS

Advantages of the present invention will become apparent to those skilled in the art with the benefit of the following detailed description of embodiments and upon reference to the accompanying drawings in which:

FIG. 14 depicts an X-ray structure of the metal-organic framework poly-$(Pyz_2\{[3,5-(CF_3)_2Pz]Cu\}_2$—i.e., MOF-TW1 showing.

Figure 1:
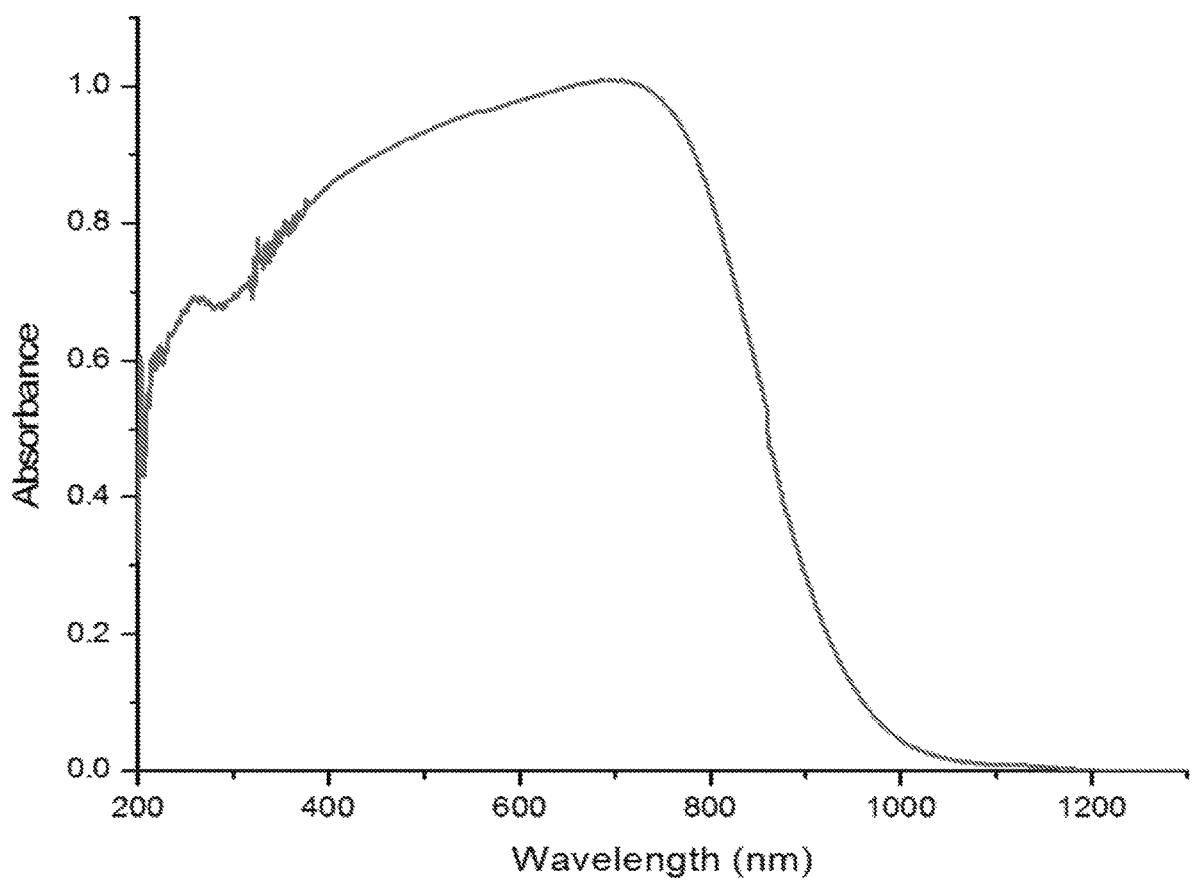
FIG. 1 depicts the solid-state absorption spectrum for poly-$(PAP_3\{[3,5-(CF_3)_2Pz]Cu\}_2)$—.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Unless defined otherwise, all technical and scientific terms used herein have the same meaning as commonly understood by one of ordinary skill in the art.

The term "alkyl" as used herein generally refers to a chemical substituent containing the monovalent group $C_nH_{2n}$, where n is an integer greater than zero. In some embodiments n is 1 to 12. The term "alkyl" includes a branched or unbranched monovalent hydrocarbon radical. Examples of alkyl radicals include, but are not limited to: methyl, ethyl, propyl, isopropyl, butyl, iso-butyl, sec-butyl, pentyl, 3-pentyl, hexyl, heptyl, octyl, nonyl, decyl, undecyl, dodecyl. When the alkyl group has from 1-6 carbon atoms, it is referred to as a "lower alkyl." Suitable lower alkyl radicals include, but are not limited to, methyl, ethyl, n-propyl, i-propyl, 2-propenyl (or allyl), n-butyl, t-butyl, and i-butyl (or 2-methylpropyl).

The term "halogen" is used herein to refer to fluorine, bromine, chlorine and iodine atoms.

The term "aryl" is used to refer to an aromatic substituent which may be a single ring or multiple rings which are fused together, linked covalently, or linked to a common group such as an ethylene moiety. Aromatic ring(s) include but are not limited to phenyl, naphthyl, biphenyl, diphenylmethyl, and 2,2-diphenyl-1-ethyl. The aryl group may also be substituted with substituents including, but not limited to, alkyl groups, halogen atoms, nitro groups, carboxyl groups, alkoxy, and phenoxy to give a "substituted aryl group." Substituents may be attached at any position on the aryl radical which would otherwise be occupied by a hydrogen atom.

The term "heterocycle" as used herein generally refers to a closed-ring structure, in which one or more of the atoms in the ring is an element other than carbon. Heterocycle may include aromatic compounds or non-aromatic compounds. Heterocycles may include rings such as thiophene, pyridine, isoxazole, phthalimide, pyrazole, indole, furan, or benzo-fused analogs of these rings. Examples of heterocycles include tetrahydrofuran, morpholine, piperidine, pyrrolidine, and others. In some embodiments, "heterocycle" is intended to mean a stable 5- to 7-membered monocyclic or bicyclic or 7- to 10-membered bicyclic heterocyclic ring which is either saturated or unsaturated, and which consists of carbon atoms and from 1 to 4 heteroatoms (e.g., N, O, and S) and wherein the nitrogen and sulfur heteroatoms may optionally be oxidized, and the nitrogen may optionally be quaternized, and including any bicyclic group in which any of the above-defined heterocyclic rings is fused to a benzene ring. In some embodiments, heterocycles may include cyclic rings including boron atoms. The heterocyclic ring may be attached to its pendant group at any heteroatom or carbon atom that results in a stable structure. The heterocyclic rings described herein may be substituted on carbon or on a nitrogen atom if the resulting compound is stable. Also included are fused ring and spiro compounds containing, for example, the above heterocycles. The term "heteroaryl" has an equivalent meaning as heterocycle, and these terms are used interchangeably.

In one embodiment, a coordination polymer includes at least one transition metal atom or lanthanide metal atom and at least one neutral bridging electron-donor organic ligand and/or a negatively-charged counterion. In some embodiments, the coordination polymer comprises an anionic ligand. In some embodiments, the coordination polymer comprises an anionic counterion.

In one embodiment, the coordination polymer is a polymer having repeat units of the structure (I):

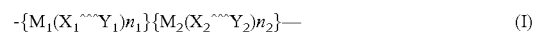

where:
M$_1$ and M$_2$ are each, independently, a transition metal or a lanthanide metal;
X$_1$, X$_2$, Y$_1$, and Y$_2$ are each, independently N, O, P, or S;
each $^{\wedge\wedge\wedge}$ represents, independently, an alkyl or aryl hydrocarbon group linking the respective groups X$_1$/Y$_1$ and X$_2$/Y$_2$ together; and
n$_1$+n$_2$=the coordination number of M$_1$+the coordination number of M$_2$.

In a preferred embodiment, M$_1$ and M$_2$ are selected from the group consisting of copper, silver and gold.

In one embodiment, the coordination polymer is a polymer having repeat units of the structure (II):

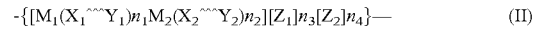

where:
M$_1$ and M$_2$ are each, independently, a transition metal or a lanthanide metal;
X$_1$, X$_2$, Y$_1$, and Y$_2$ are each, independently N, O, P, or S;
each ˆˆˆ represents, independently, an alkyl or aryl hydrocarbon group linking the respective groups X$_1$/Y$_1$ and X$_2$/Y$_2$ together; and
n$_1$+n$_2$=the coordination number of M$_1$+the coordination number of M$_2$;
n$_3$+n$_4$=the oxidation state of the M$_1$+the oxidation state of M$_2$.

In a preferred embodiment, M$_1$ and M$_2$ are selected from the group consisting of copper, silver and gold.

In one embodiment, the coordination polymer is a polymer having repeat units of the structure (III):

(III)

where:
M$_1$ is a transition metal or a lanthanide metal;
X$_1$ and Y$_1$ are each, independently N, O, P, or S;
each ˆˆˆ represents, independently, an alkyl or aryl hydrocarbon group linking X$_1$ and Y$_1$ together; and
n$_1$ is the coordination number of M$_1$.

In a preferred embodiment, M$_1$ is selected from the group consisting of copper, silver and gold.

In one embodiment, the coordination polymer is a polymer having repeat units of the structure (IV):

(IV)

where:
M$_1$ and M$_2$ are each, independently, a transition metal or a lanthanide metal;
X$_1$ and Y$_1$ are each, independently N, O, P, or S;
each ˆˆˆ represents, independently, an alkyl or aryl hydrocarbon group linking the
respective groups X$_1$ and Y$_1$ together; and
n$_1$ is the coordination number of M$_1$.
n$_3$ is the oxidation state of the M$_1$.

In a preferred embodiment, M$_1$ and M$_2$ are selected from the group consisting of copper, silver and gold.

Transition metals (M$_1$ and M$_2$) include metals in groups 3 through 12 of the periodic table. Specific transition metals that are useful for the formation of coordination polymers include, but are not limited to: copper, silver, gold, zinc, zirconium, manganese, nickel, palladium, and platinum. Specific oxidation states of these metals are particularly useful and include, but are not limited to: Cu(I), Cu(II), Ag(I), Au(I), Au(III), Zn(II), Zr(IV), Mn(II), Ni(O), Ni(II), Pd(0), Pd(II), Pt(0), Pt(II)

In specific embodiments, M$_1$ and/or M$_2$ of the coordination polymer of any of structures (I), (II), (III), and (IV) is Cu(I).

Lanthanide metals (M$_1$ and M$_2$) include the fifteen metallic chemical elements with atomic numbers 57 through 71. Specific lanthanide metals that are useful for the formation of coordination polymers include, but are not limited to gadolinium, europium, and terbium. Specific oxidation states of these metals are particularly useful and include, but are not limited to: Gd(III), Eu(III), and Tb(III).

In specific embodiments, the compounds (X$_1$ˆˆˆY$_1$) and/or (X$_2$ˆˆˆY$_2$) of the coordination polymer of any of structures (I), (II), (III), and (IV) is a heterocycle compound having at least two heteroatoms. Examples of heterocyclic compounds having at least two heteroatoms include, but are not limited to: 1H-indazole, 1,5,2-dithiazine, 1,2,5-thiadiazole, furazan, oxazole, phenanthroline, phenarsazine, phenazine, phenothiazine, phenoxathine, phenoxazine, phthalazine, pteridine, purine, pyrazine, pyrazole (or its deprotonated pyrazolate ligand), pyridazine, bispyridine, pyrimidine, quinazoline, quinoxaline, tetrazole, thianthrene, thiazole, triazine. The heterocycle compound may be substituted or unsubstituted. In a specific embodiment, the compounds (X$_1$ˆˆˆY$_1$) and/or (X$_2$ˆˆˆY$_2$) of the coordination polymer of any of structures (I), (II), (III), and (IV) is pyrazolate, a substituted pyrazolate, pyrazine, a substituted pyrazine, bispyridine, or a substituted bispyradine.

In a specific embodiment, the compound (X$_1$ˆˆˆY$_1$) and/or (X$_2$ˆˆˆY$_2$) is a pyrazolate having the structure (V):

(V)

where each of R$^3$, R$^4$, and R$^5$ is independently alkyl, halogenated alkyl, phenyl, or aryl; where the dashed lines (-------) represent a bond to either M$_1$ or M$_2$.

Exemplary heterocyclic compounds that may be used as compound (X$_1$ˆˆˆY$_1$) and/or (X$_2$ˆˆˆY$_2$) of the coordination polymer of any of structures (I), (II), (III), and (IV) include, but are not limited to, 3,5-bis(trifluoromethyl)pyrazolate (3,5-(CF$_3$)$_2$Pz), 4,4'-azopyridine (PAP), 4,4'-bipyridine, 1,2-bis(4-pyridyl)ethane, 1,4-pyrazine, or 1,2-bis(4-pyridyl)ethylene.

In some embodiments, the compounds (X$_1$ˆˆˆY$_1$) and/or (X$_2$ˆˆˆY$_2$) of the coordination polymer of any of structures (I), (II), (III), and (IV) is a neutral bridging ligand. Exemplary neutral bridging ligands include, but are not limited to: an alkyl diamine, an alkylene diamine, a polyalkylene polyamine, and a polyimine.

In some embodiment, the coordination polymer includes an anionic counterion. Exemplary anionic counterions include, but are not limited to, anionic halogen, anionic substituted boron, and anionic substituted phosphorous.

A specific exemplary coordination polymer is the polymer:

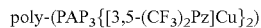

which corresponds to the coordination polymer of structure (I) where: M$_1$ is Cu(I); M$_2$ is Cu(I); X$_1$ˆˆˆY$_1$ is 4,4'-azopyridine (PAP); X$_2$ˆˆˆY$_2$ is 3,5-bis(trifluoromethyl)pyrazolate (3,5-(CF$_3$)$_2$Pz), n$_1$ is 3; and n$_2$ is 1.

A specific exemplary coordination polymer is the polymer:

which corresponds to the coordination polymer of structure (IV) where: M$_1$ is Cu(I); X$_1$ˆˆˆY$_1$ is 4,4'-azopyridine (PAP); Z$_1$ is BF$_4$; n$_1$ is 4; and n$_3$ is 1.

A specific exemplary coordination polymer is the polymer:

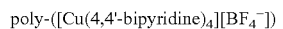

which corresponds to the coordination polymer of structure (IV) where: M$_1$ is Cu(I); X$_1$ˆˆˆY$_1$ is 4,4'-bipyridine; Z$_1$ is BF$_4$; n$_1$ is 4; and n$_3$ is 1.

A specific exemplary coordination polymer is the polymer:

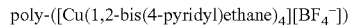

which corresponds to the coordination polymer of structure (IV) where: M$_1$ is Cu(I); X$_1$ˆˆˆY$_1$ is 1,2-bis(4-pyridyl)ethane; Z$_1$ is BF$_4$; n$_1$ is 4; and n$_3$ is 1.

A specific exemplary coordination polymer is the polymer:

poly-([Cu(1,4-pyrazine)$_4$][BF$_4^-$])

which corresponds to the coordination polymer of structure (IV) where: $M_1$ is Cu(I); $X_1 \frown Y_1$ is 1,4-pyrazine; $Z_1$ is BF$_4$; $n_1$ is 4; and $n_3$ is 1.

A specific exemplary coordination polymer is the polymer:

poly-([Cu(1,2-bis(4-pyridyl)ethylene)$_4$][BF$_4^-$])

which corresponds to the coordination polymer of structure (IV) where: $M_1$ is Cu(I); $X_1 \frown Y_1$ is 1,4-pyrazine; $Z_1$ is BF$_4$; $n_1$ is 4; and $n_3$ is 1.

A method general method of preparing a coordination polymer includes: mixing a transition metal compound a negatively charged counterion precursor to form am intermediate product; and mixing the intermediate product with at least one neutral bridging electron-donor organic ligand to form the coordination polymer. Suitable solvents can be used during the mixing steps. Typically organic solvents are used, including, but not limited to benzene, acetonitrile, or combinations of these solvents, depending on the solubility of the reagents.

Typically, the coordination polymer will precipitate out of the mixture as it forms. The precipitated coordination polymer is collected and dried (e.g., under vacuum).

The coordination polymers described herein may be used in a variety of applications. For example, the coordination polymers described herein may be used in an optoelectronic device. For example, the coordination polymers may be used as: an active component in an organic optoelectronic device; a passive component in an organic optoelectronic device; an active component in a metal-organic optoelectronic device; a passive component in a metal-organic optoelectronic device; an active component in a hybrid organic/inorganic optoelectronic device; or a passive component in a hybrid organic/inorganic optoelectronic device, and an organic photovoltaic cell.

The coordination polymers described herein may also be used in applications such as: solid-state batteries; capacitors; optical sensors, gas storage devices, gas separation devices, hazardous material removal devices. The coordination polymers may also be used as a heterogeneous catalyst or a homogenous catalyst.

Specific exemplary devices that the coordination polymers described herein may be used include, but are not limited to: organic photovoltaic (OPV) solar cell devices; light-emitting diodes (LEDs); room-temperature conductors/semiconductors/photoconductors; non-flammable solid-state batteries; supercapacitors; transistors; diodes; RFID tags; low-K dielectrics; single molecule magnets; MRI contrast reagent; adsorbents for fuel cells and other physisorption or chemisorption application; and sensors for various air or water pollutants.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

A. Synthesis

Figure 18A:
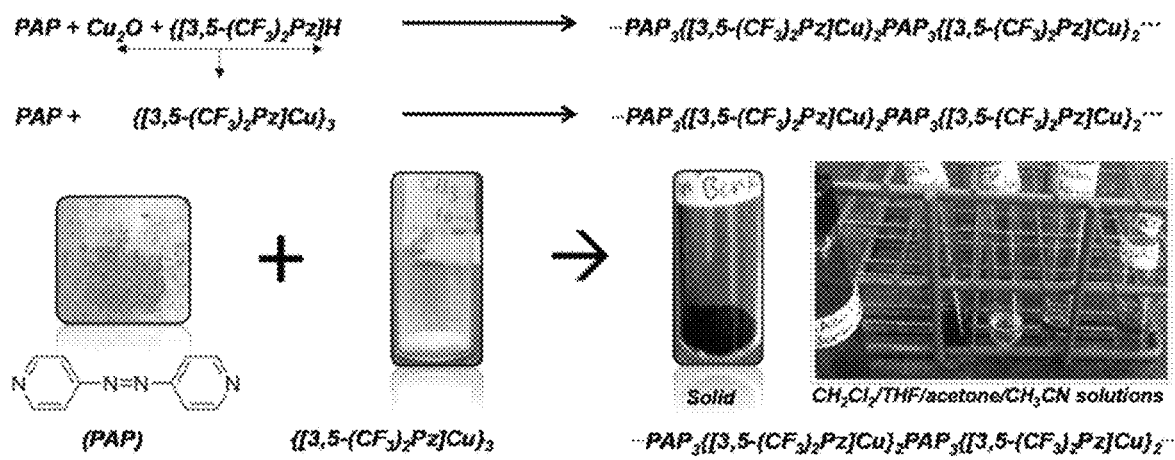
FIG. 18A shows a scheme for a synthetic route for poly-(PAP$_3$\{[3,5-(CF$_3$)$_2$Pz]Cu\}$_2$)
Figure 18B:
FIG. 18B shows a scheme for the general preparation strategy of: (a) neutral -M$_1$(X$_1$$^{\wedge\wedge\wedge}$Y$_1$)n$_1$\{M$_2$(X$_2$$^{\wedge\wedge\wedge}$Y$_2$)n$_2$\}-, and (b) ionic -\{[M$_1$(X$_1$$^{\wedge\wedge\wedge}$Y$_1$)n$_1$\{M$_2$(X$_2$$^{\wedge\wedge\wedge}$Y$_2$)n$_2$][Z$_1$]n$_3$[Z$_2$]n$_4$\}-functional coordination polymers with multiple compositional and structural variations.
Figure 18B:
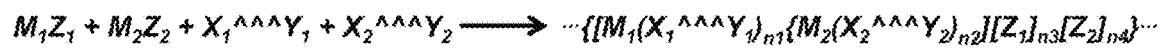

Scheme 1 (depicted in FIG. 18A) shows the synthetic route for poly-(PAP$_3${[3,5-(CF$_3$)$_2$Pz]Cu}$_2$). Scheme 2 (depicted in FIG. 18B) shows the general preparation strategy of: (a) neutral -M$_1$(X$_1 \frown$Y$_1$)n$_1${M$_2$(X$_2 \frown$Y$_2$)n$_2$}-, and (b) ionic -{[M$_1$(X$_1 \frown$Y$_1$)n$_1${M$_2$(X$_2 \frown$Y$_2$)n$_2$}][Z$_1$]n$_3$[Z$_2$]n$_4$}- functional coordination polymers with multiple compositional and structural variations.

All manipulations were carried out under an atmosphere of purified nitrogen using standard Schlenk techniques. Dried and purified, ACS reagent grade benzene was used as a solvent to carry out the synthesis. $^1$H-NMR spectra were recorded at 25° C. on a Varian 400 spectrometer; the proton chemical shifts were reported in ppm versus dichloromethane. IR spectra were recorded at 25° C. on a Shimadzu FTIR spectrometer. TGA spectra were recorded at 25° C. on a TA Q50 TGA analyzer. UV/vis/NIR and diffuse reflectance spectra were recorded on a Perkin-Elmer Lambda 900 electronic absorption spectrophotometer.

Example 1

Synthesis of poly-(PAP$_3${[3,5-(CF$_3$)$_2$Pz]Cu}$_2$)— Neutral Coordination Polymer For the compound shown in Scheme 1, Cu$_2$O (0.19 g, 1.43 mmol) and [3,5-(CF$_3$)$_2$Pz]H (0.50 g, 2.45 mmol) were mixed in 20 mL of benzene to synthesize {[3,5-(CF$_3$)$_2$Pz]Cu}$_3$ based on a literature procedure (Dias, H. V. R., Polach, S. A., Wang, Z. J. Fluor. Chem. 2000, 103, 163, which is incorporated herein by reference). The mixture was filtered and the filtrate was collected. {[3,5-(CF$_3$)$_2$Pz]Cu}$_3$ (0.1 g, 1 mmol) and 4,4'-azopyridine (PAP) (0.071 g, 3 mmol) were mixed in benzene (10 mL). A black product started to form instantly. The product was collected using vacuum filtration and further dried under vacuum for 2 hours. The black product obtained (melting point=165° C.) has no luminescence. The product was very soluble in acetone, acetonitrile, tetrahydrofuran (THF) and dichloromethane (DCM). The crystals were grown in acetonitrile using slow evaporation for 2 days under nitrogen atmosphere at 25° C. to obtain X-ray quality crystals. $^1$H-NMR (reference to DCM) δ/ppm: 7.1 correspond to Pz (C—H), 7.4, 7.8 and 8.8 correspond to PAP (C—H). IR: aromatic C—H stretch: 3133.38 cm$^{-1}$, aliphatic C—H stretch: 3023.29 cm$^{-1}$, C≡N stretch: 2292.52 cm$^{-1}$, N═N stretch: 2119.19 cm$^{-1}$, aromatic C═C bend: 1592.19 cm$^{-1}$, aromatic C—C stretch: 1561.74 cm$^{-1}$.

Example 2

Synthesis of poly-[Cu(PAP)$_4$][BF$_4^-$]— Ionic Coordination Polymer

This embodiment corresponds to the Scheme 2(b) variable of an ionic functional coordination polymer:

-{[M$_1$(X$_1 \frown$Y$_1$)n$_1$][Z$_1$]n$_3$}-

Where: M$_1$=Cu(I); X$_1 \frown$Y$_1$=PAP; Z$_1$=BF$_4^{31}$; n$_1$=4, and n$_3$=1.

For this compound, [Cu(CH$_3$CN)$_4$][BF$_4$](0.1 g, 1 mmol) was prepared based on a literature procedure (Kubas, G. J. Inorg. Synth. 1979, 19, 90, which is incorporated herein by reference) and 4,4'-azopyridine (PAP) (0.234 g, 4 mmol) were mixed in acetonitrile (10 mL). A black product started to form in 2 hours. The product was collected using vacuum filtration and further dried under vacuum for 2 hours. The black product obtained (melting point=380-385° C.) has no luminescence. The product was soluble in acetonitrile. The crystals were grown in acetonitrile using slow evaporation for 2 days under nitrogen atmosphere at 25° C. to obtain X-ray quality crystals. $^1$HNMR (reference to acetonitrile) δ/ppm: 7.7, 7.8 and 8.8 correspond to PAP (C—H). IR: aromatic C—H stretch: 3098.24 cm$^{-1}$, aliphatic C—H stretch: 3060.77 cm$^{-1}$, C≡N stretch: 322.97 cm$^{-1}$, N═N stretch: 2105.14 cm$^{-1}$, aromatic C═C bend: 1590.19 cm$^{-1}$, aromatic C—C stretch: 1557.06 cm$^{-1}$.

Example 3

Synthesis of poly-[Cu(4,4'-bipyridine)$_4$][BF$_4^-$]—Ionic Coordination Polymer This embodiment corresponds to the Scheme 2(b) variable of an ionic functional coordination polymer:

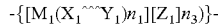

Where: $M_1$=Cu(I); $X_1$⌒$Y_1$=4,4'-bipyridine; $Z_1$=BF$_4^-$; $n_1$=4, and $n_3$=1.

For this compound, [Cu(CH$_3$CN)$_4$][BF$_4^-$](0.1 g, 1 mmol) was prepared based on a literature procedure (Kubas, G. J. Inorg. Synth. 1979, 19, 90, which is incorporated herein by reference) and (4,4'-bipyridine) (0.198 g, 4 mmol) were mixed in acetonitrile (10 mL). An orange product started to form in 2 hours. The product was collected using vacuum filtration and further dried under vacuum for 2 hours. The orange product obtained (melting point=360-365 δC(dec)) has no luminescence. The product was soluble in acetonitrile. The crystals were grown in acetonitrile using slow evaporation for 2 days under nitrogen atmosphere at 25° C. to obtain X-ray quality crystals. $^1$H-NMR (reference to acetonitrile) δ/ppm: 7.7 and 8.6 correspond to bpy (C—H). IR: aromatic C—H stretch: 3040.02 cmi, aliphatic C—H stretch: 3029.40 cm$^{-1}$, C≡N stretch: 2250.81 cm$^{-1}$, aromatic C═C bend: 1604.33 cm$^{-1}$, aromatic C—C stretch: 1554.72 cm$^{-1}$.

Example 4

Synthesis of poly-[Cu(1,2-bis(4-pyridyl)ethane)$_4$][BF$_4^-$]— Ionic Coordination Polymer This embodiment corresponds to the Scheme 2(b) variable of an ionic functional coordination polymer:

Where: $M_1$=Cu(I); $X_1$⌒$Y_1$=1,2-bis(4-pyridyl)ethane; $Z_1$=BF$_4^-$; $n_1$=4, and $n_3$=1.

For this compound, [Cu(CH$_3$CN)$_4$][BF$_4^-$](0.1 g, 1 mmol) was prepared based on a literature procedure (Kubas, G. J. Inorg. Synth. 1979, 19, 90, which is incorporated herein by reference) and 1,2-Bis(4-pyridyl)ethane (0.234 g, 4 mmol) were mixed in acetonitrile (10 mL). A white-yellowish product started to form in 2 hours. The product was collected using vacuum filtration and further dried under vacuum for 2 hours. The white-yellowish product obtained (melting point=260 δC (dec)) has yellow luminescence. The product was soluble in acetonitrile. Several attempts of crystallization were unsuccessful in producing suitable crystals because of its high sensitivity to air. $^1$H-NMR (reference to acetonitrile) δ/ppm: 2.9, 7.3 and 8.5 correspond to bpa (C—H). IR: aromatic C—H stretch: 3042.03 cm$^{-1}$, aliphatic C—H stretch: 2931.95 cm$^{-1}$, C≡N stretch: 2252.70 cm$^{-1}$, aromatic C═C bend: 1596.88 cm$^{-1}$, aromatic C—C stretch: 1554.72 cm$^{-1}$.

Example 5

Figure 19:
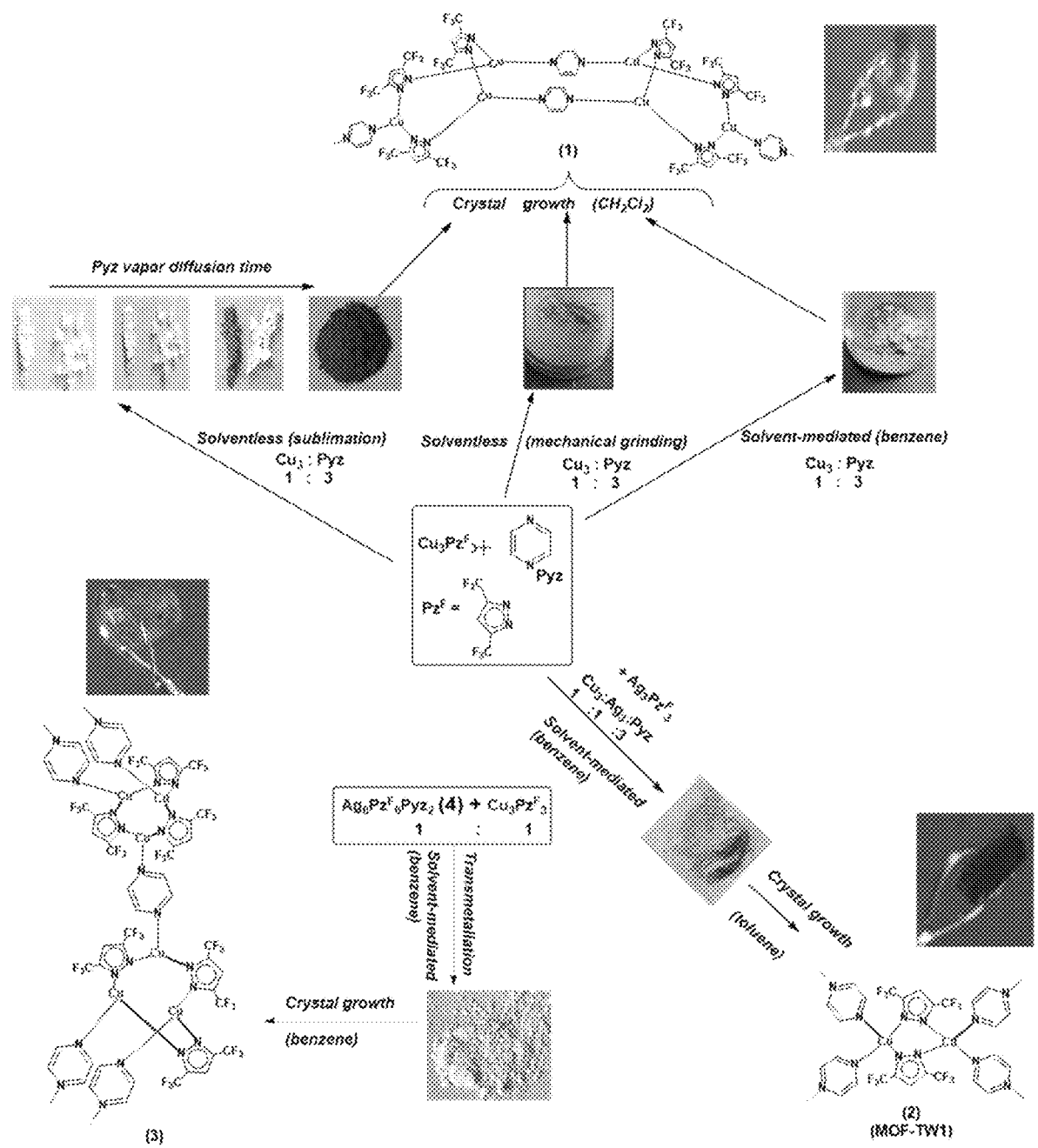
FIG. 19 shows a scheme for the synthesis of poly-(Pyz$_{n1}$\{[3,5-(CF$_3$)$_2$Pz]Cu\}$_{n2}$) — neutral coordination polymers and metal-organic frameworks.

Synthesis of poly-(Pyz$_{n1}${[3,5-(CF$_3$)$_2$Pz]Cu}$_{n2}$)—Neutral Coordination Polymers and Metal-Organic Frameworks These embodiments correspond to the three Scheme 3 (shown in FIG. 19) variables of neutral functional coordination polymers of copper(I).

Synthesis of 1. Both solventless and solvent-mediated transformations attained this product. One solventless route entailed a 1:3 molar ratio of {[3,5-(CF$_3$)$_2$Pz]Cu}$_3$ (0.1 g) and pyrazine (0.034 g) being mixed in a closed vial where they were left to react. Due to the fact that pyrazine sublimes as well at room temperature and ambient pressure, it reacts in the gas phase via the vapor of its solid with the less volatile {[3,5-(CF$_3$)$_2$Pz]Cu}$_3$ cyclotrimer solid, resulting in a color change of the white copper trimer immediately to yellow, orange, and ultimately maroon—gradually as time goes by. The reaction starts occurring in a minute time scale and takes approximately 20 min to completion. The solventless route can be further accelerated by mechanical grinding of the same stoichiometric amounts, whereby the reaction starts occurring instantly and is completed within a minute time scale. The maroon product obtained was very soluble in acetone and acetonitrile, among other common organic solvents. Finally, the solvent-mediated route involved the reaction of a 1:3 molar ratio of {[3,5-(CF$_3$)$_2$Pz]Cu}$_3$ (0.097 g) and pyrazine (0.0336 g) in 10 mL of benzene. The solution color changed immediately to orange. The resulting product was obtained by removing the solvent under reduced pressure and further dried by vacuuming for extra 2 hrs. X-ray quality crystals were obtained from hot benzene/dichloromethane. M.p. 180° C. $^1$H-NMR using as reference acetonitrile d$_3$δ resulted in the following resonances: 6.98 ppm (Pz$^F$, C—H), 8.70 ppm (Pyz, C—H). IR: 2134.15 cm$^{-1}$ (C≡N stretch), 1940.45 cm$^{-1}$ (aromatic C═C bend), 1509.64 cm$^{-1}$ (aromatic C—C stretch), 3094.25 cm$^{-1}$ (aromatic C—H stretch). Anal. Calcd. for C$_{42}$H$_{18}$Cu$_6$F$_{36}$N$_{18}$: C, 27.42; H, 0.99; N, 13.70%. Found: C, 27.07; H, 0.81; N, 13.35% (without dichloromethane).

Synthesis of 2. The reaction entailed a 1:1:3 molar ratio of {[3,5-(CF$_3$)$_2$Pz]Cu}$_3$ (0.097 g), {[3,5-(CF$_3$)$_2$Pz]Ag}$_3$ (0.1 g), and pyrazine (0.0336 g), all mixed in 10 mL of benzene. The color of solution changed immediately to light orange. The reaction was stirred for 6 hours. The resulting product was obtained by removing solvent using vacuum and further dried by vacuuming for extra 2 hours. The product was soluble in most of organic solvents, including benzene and acetonitrile. X-ray quality crystals were obtained from hot toluene. M.p. 160° C. $^1$H-NMR using as reference acetonitrile d$_3$δ resulted in the following resonances: 7.40 ppm (Pz$^F$, C—H), 8.70 ppm (Pyz, C—H). IR: 2964.25 cm$^{-1}$ (aromatic C—H stretch), 2049.15 cm$^{-1}$ (C≡N stretch), 1695.45 cm$^{-1}$ (aromatic C═C bend), 1519.64 cm$^{-1}$ (aromatic C—C stretch). Anal. Calcd. for C$_{18}$H$_{10}$Cu$_2$F$_{12}$N$_8$: C, 31.18; H, 1.45; N, 16.16%. Found: C, 30.66; H, 1.37; N, 15.65%. (without toluene).

Synthesis of 3. A 1:1 molar ratio reaction was carried out whereby {[3,5-(CF$_3$)$_2$Pz]Cu}$_3$ (0.1 g) and {Ag$_6$[3,5-(CF$_3$)$_2$Pz]$_6$(Pyz)$_2$(benzene)$_2$}(0.27 g—synthesized following the same procedure below for complex 4) were mixed in 10 mL of benzene. A light yellow color started to form immediately. The reaction was stirred for 2 hours. The resulting product was obtained by removing solvent using vacuum for 2 hours. The light yellow solid product obtained has no luminescence. The product was very soluble in organic solvents, such as benzene, acetone and acetonitrile. X-ray quality crystals were obtained from hot benzene. M.p. 155° C. $^1$H-NMR using as reference acetonitrile $d_3\delta$ resulted in the following resonances: 7.00 ppm ($Pz^F$, C—H), 8.56 ppm (Pyz, C—H), IR: 2964.25 cm$^{-1}$ (aromatic C—H stretch), 2049.15 cm$^{-1}$ (C≡N stretch), 1785.45 cm$^{-1}$ (aromatic C═C bend), 1619.64 cm$^{-1}$ (aromatic C—C stretch). Anal. Calcd. for $C_{24}H_{12}Cu_3F_{18}N_9$: C, 30.06; H, 1.26; N, 13.14%. Found: C, 30.18; H, 1.34; N, 13.98% (without benzene).

Example 6

Figure 20:
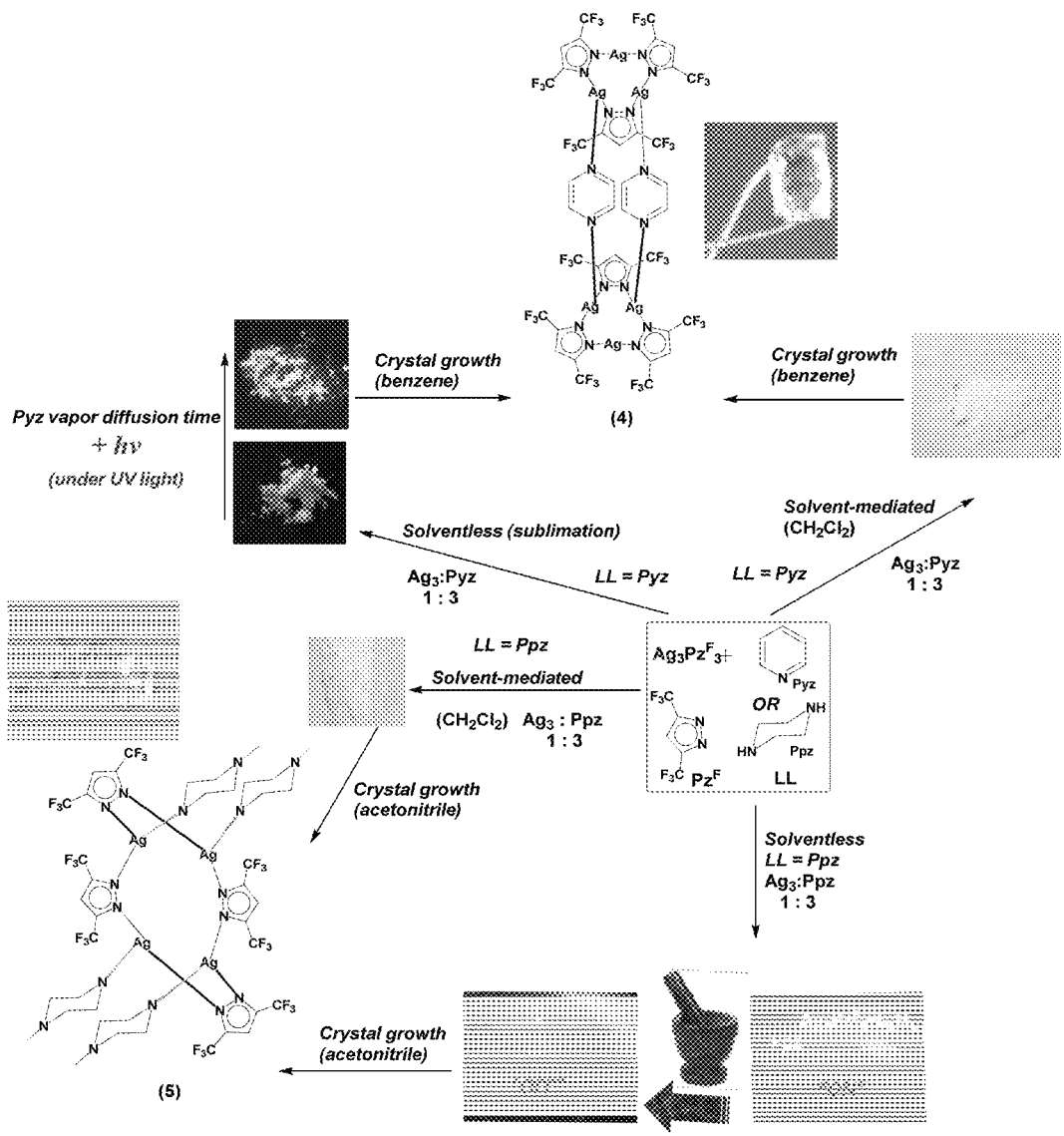
FIG. 20 shows a scheme for the synthesis of poly-([(X$_1$$^{\wedge\wedge\wedge}$Y$_1$)]$_{n1}$\{[3,5-(CF$_3$)$_2$Pz]Ag\}$_{n2}$)— neutral coordination polymers and oligomers.

Synthesis of poly-([$(X_1$^^^$Y_1)]_{n1}$ {3,5-$(CF_3)_2$Pz]Ag}$_{n2}$)— Neutral Coordination Polymers and Oligomers These embodiments correspond to the two Scheme 4 (shown in FIG. 20) variables of neutral functional coordination oligomer 4 and coordination polymer 5 of silver(I):

Synthesis of 4. A 1:3 molar ratio reaction was carried out whereby {[3,5-$(CF_3)_2$Pz]Ag}$_3$ (0.1 g) and pyrazine (0.028 g) were mixed in dichloromethane (10 mL). The reaction was stirred for 2 hours. The resulting product was obtained by removing solvent using vacuum for 2 hours. The white product obtained has blue luminescence. The product was partially soluble in organic solvents, such as acetonitrile and acetone. X-ray quality crystals were obtained from dichloromethane by slow evaporation. M.p. 170° C. $^1$H-NMR using as reference acetonitrile $d_3\delta$ resulted in the following resonances: 7.3 ppm ($Pz^F$, C—H), 8.70 ppm (Pyz, C—H). IR: 3160.06 cm$^{-1}$ (aromatic C—H stretch), 2165 cm$^{-1}$ (C≡N stretch), 2170.45 cm$^{-1}$ (aromatic C═C bend), 1972.38 cm$^{-1}$ (aromatic C—C stretch). Anal. Calcd. for $C_{38}H_{14}Ag_6F_{36}N_{16}$: C, 22.53; H, 0.70; N, 11.06%. Found: C, 21.66; H, 0.33; N, 10.70% (without 2 molecules of benzene).

Synthesis of 5. A 1:3 molar ratio reaction was carried out whereby {[3,5-$(CF_3)_2$Pz]Ag}$_3$ (0.1 g) and piperazine (Ppz) (0.066 g) were mixed in dichloromethane (10 mL); varying the molar ratio to 1:6 or 1:2 attained the same subsequent observations. The reaction was stirred for 2 hours. The product was collected using vacuum filtration and further dried under vacuuming for 2 hours. The white product obtained has no luminescence. The product was insoluble in most organic solvents, such as benzene and dichloromethane, but it is partially soluble in acetonitrile. Using sonication and filtration was essential to acquire the best result for recrystallization. X-ray quality crystals were obtained from acetonitrile by slow evaporation. M.p. 250° C. (dec.). $^1$H-NMR using as reference acetone $d_6\delta$ resulted in the following resonances: 7.1 ppm ($Pz^F$, C—H), 2.85 ppm (Ppz, C—H$_2$), 1.90 ppm (Ppz, N—H). IR: 3276.73 cm$^{-1}$ (N—H stretch), 3020.98 cm$^{-1}$ (aromatic C—H stretch), 2847.67 cm$^{-1}$ (aliphatic C—H stretch), 2353.23 cm$^{-1}$ (C≡N stretch), 1531.90 cm$^{-1}$ (aromatic C═C bend), 1433.83 cm$^{-1}$ (aromatic C—C stretch). Anal. Calcd. for $C_{14}H_{12}Ag_2F_{12}N_6$: C, 23.75; H, 1.71; N, 11.87%. Found: C, 23.07; H, 0.89; N, 11.12%.

Example 7

Synthesis of poly-Cu(1,4-pyrazine)$_2$(acetonitrile)$_2$][$BF_4^-$]— Ionic Coordination Polymer This embodiment corresponds to the Scheme 2(b) variable of an ionic functional coordination polymer:

-{[$M_1(X_1$^^^$Y_1)n_1$][$Z_1)n_3$]}-

Figure 21:
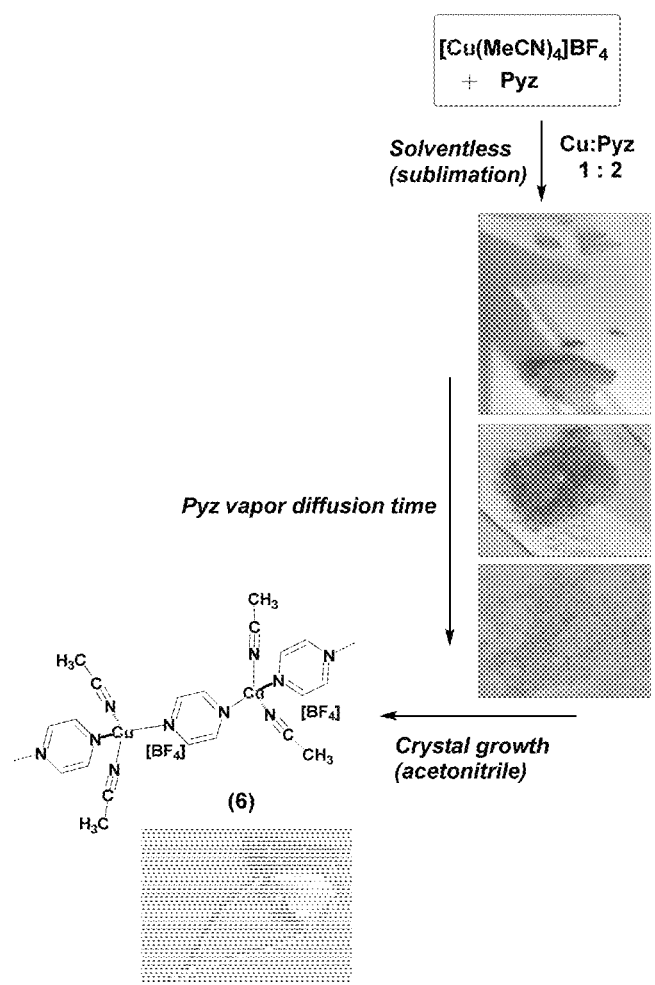
FIG. 21 shows a scheme for the synthesis of poly-[Cu(1,4-pyrazine)$_2$(acetonitrile)$_2$][BF$_4^-$]— ionic coordination polymer.

Where: $M_1$=Cu(I); $X_1$^^^$Y_1$=1,4-pyrazine; $Z_1$=$BF_4$; $n_1$=2, and $n_3$=1, as shown in Scheme 5 (depicted in FIG. 21).

Synthesis of 6. A 1:2 (or 1:4) molar ratio reaction was carried out whereby [Cu(MeCN)$_4$]BF$_4$ (0.1 g) and pyrazine (Pyz) (0.05 g) were mixed in a closed vial where they were left to react. Due to the fact that pyrazine sublimes at room temperature, [Cu(MeCN)$_4$]BF$_4$ reacts with pyrazine in the gas phase resulting in a color change of the white copper precursor immediately to yellow. The product was soluble only in acetonitrile. The yellow product was crystalized using acetonitrile and slow evaporation for 2 days under inert atmosphere using purified nitrogen gas to obtain X-ray quality single crystals. M.p.>500° C. $^1$H-NMR using as reference acetonitrile $d_3\delta$ resulted in the following resonances: 8.4 ppm (Pyz, C—H). IR: 2102.80 cm$^{-1}$ (C≡N stretch), 1976.32 cm$^{-1}$ (aromatic C═C bend), 1592.19 cm$^{-1}$ (aromatic C—C stretch), 3058.43 cm$^{-1}$ (aromatic C—H stretch). Anal. Calcd. for $C_8H_{10}BCuF_4N_4$: C, 30.74; H, 3.23; N, 17.93%. Found: C, 31.04; H, 2.68; N, 17.94.

B. Spectral Properties

Here we provide a discussion of the spectral properties of three examples of preferred embodiments with an extensive discussion of how one embodiment compares favorably with the state of the art for its use in solar cell applications.

Figure 2:
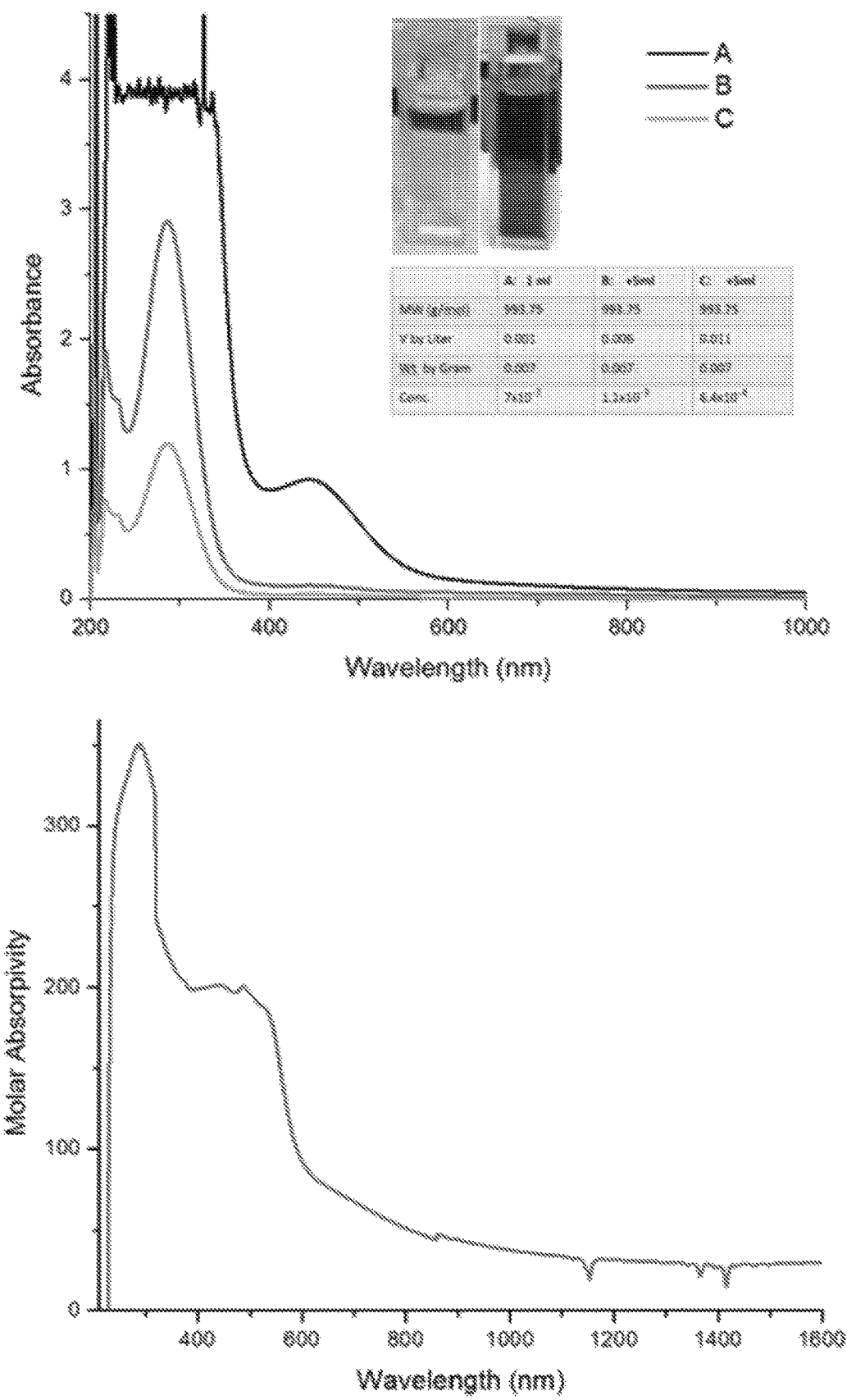
FIG. 2 depicts the solution absorption spectra for different concentrations of poly-$(PAP_3\{[3,5-(CF_3)_2Pz]Cu\}_2)$— in dichloromethane.

Absorption Properties of poly-(PAP$_3${[3,5-$(CF_3)_2$Pz]Cu}$_2$)— Neutral Coordination Polymer FIG. 1 shows the solid-state absorption spectrum for one preferred embodiment, poly-(PAP$_3${[3,5-$(CF_3)_2$Pz]Cu}$_2$)—, which covers the entire UV and visible spectral range as well as a broad NIR range. FIG. 2 shows the solution absorption spectra for different concentrations of the same poly-(PAP$_3${[3,5-$(CF_3)_2$Pz]Cu}$_2$)— in dichloromethane. The absorption in the UV region is due to ligand π-π* transitions, which appear at low concentration at similar wavelengths to those for the free PAP ligand, whereas metal-to-ligand charge transfer (MLCT) bands appear at longer wavelengths in the visible region at high concentration. In the solid-state, both π-π* and MLCT bands appear and the absorption range is extended to longer wavelengths in the visible and near-IR regions. Dissolving the solid re-generates the yellow or orange solution colors and, likewise, evaporating the solvent from solutions re-generates the black-colored solid. These properties suggest that the solid form offers a platform for extended 1D or 2D conjugation of unsaturated organic and metal units, where these chromophores are in electronic communication with one another, whereas in solution the extent of the conjugation occurs over only a few molecules in smaller cluster/oligomer aggregates (as opposed to infinite chains or sheets in the solid state).

Figure 3:
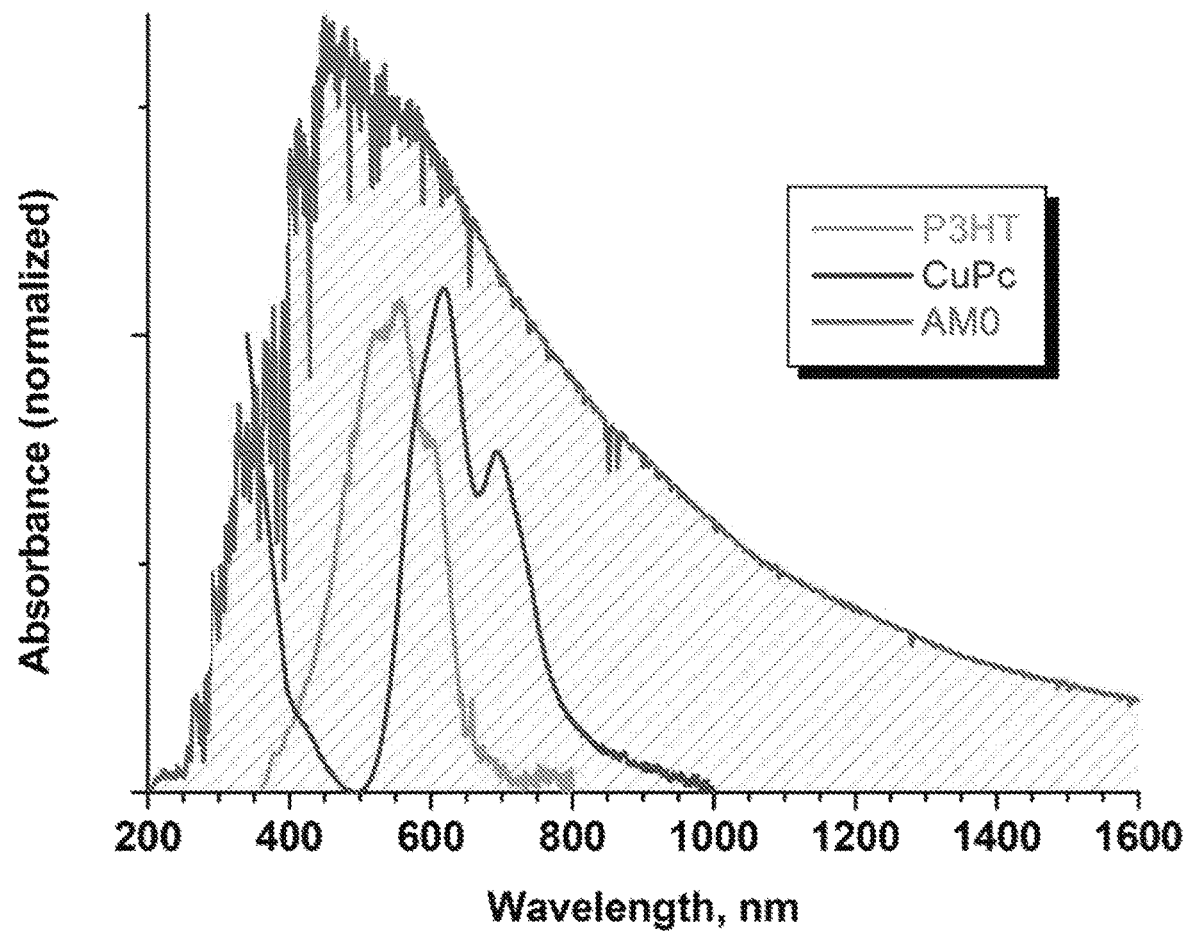
FIG. 3 depicts the solid-state absorption spectra for the prototypical materials of polymer (P3HT) and small molecule (CuPC) OPVs overlaid with the AM0 solar spectrum.

By looking at the diffuse reflectance spectra in FIG. 1, the poly-(PAP$_3${[3,5-$(CF_3)_2$Pz]Cu}$_2$)— is be able to absorb the radiation in the entire solar spectral region from 200 to 1200 nm. The absorption properties of the solid product are close to the solar cells of nanostructure properties which have attracted much attention due to the high ability of absorbing 94% of the visible light (400-800 nm wavelength range) in the so-called "nanodome solar cells" made from a thick (280 nm) nano-patterned layer of hydrogenated amorphous silicon (a-Si:H) vs 65% for typical a-Si—H solar cells based on flat thin films. The poly-(PAP$_3${[3,5-$(CF_3)_2$Pz]Cu}$_2$)—, in comparison, exhibits near-100% overlap with not only the visible light but also the UV portion of sunlight within 200-400 nm as well as significant overlap with the near-infrared (NIR) solar radiation within 800-1200 nm that a-Si:H or even crystalline silicon solar cells do not perform nearly as well in terms of NIR absorption. This behavior believed to be due to the optical bandgap being ~1200 nm for poly-(PAP$_3$\{[3,5-(CF$_3$)$_2$Pz]Cu\}$_2$)— vs ~900 nm for Si. The spectral properties of poly-(PAP$_3$\{[3,5-(CF$_3$)$_2$Pz]Cu\}$_2$)— are also superior to those of more conventional organic solar cell materials, such as poly(3-hexyl)thiophene (P3HT) and metal phthalocyanines (e.g., copper(II) phthalocyanine; i.e., CuPc), the prototypical light-absorbing materials used in polymer and small-molecule OPVs, respectively. FIG. 3 shows the solid-state absorption spectra of these conventional materials overlaid with the AM0 solar light. Inspection of this figure immediately points out the major problem with P3HT and phthalocyanine solar cells: the poor overlap of their absorption with significant portions of the ultraviolet/visible/near-infrared (UV/Vis/NIR) regions of the solar radiation makes it clear why their peak device efficiencies continue to dwell around ~5-9% or lower. These values are well-below those achieved for other types of solar cells including:

(a) Hybrid organic-inorganic solar cells: In particular, dye-sensitized solar cells (DSSCs), typically based on colloidal wide-bandgap semiconductors such as TiO$_2$ or SnO$_2$ tethered with Ru(II) and Pt(II) polypyridyl complexes as photosensitizers, have attained ~11-12% records; replacing those expensive metal centers with the metal center of choice in this invention—i.e., Cu(I)—resulted in a drastic efficiency decrease due to a rather poor overlap of their absorption spectra with the solar spectrum vs the overlap for the analogous Ru(II) or Pt(II) sensitizers or the poly-(PAP$_3$\{[3,5-(CF$_3$)$_2$Pz]Cu\}$_2$)— (FIG. 1).

(b) Inorganic solar cells: Record efficiencies of ~30% have been attained for crystalline and ~12-13% for amorphous silicon solar cells, ~40% for multi-junction germanium solar cells, ~28% for III-V semiconductor solar cells (e.g., InAs and GaAs cells), ~17.3% for other binary inorganic semiconductor solar cells besides those of III-V—such as those based on cadmium telluride (CdTe), and ~19.6% for ternary (as opposed to binary) inorganic semiconductor solar cells—such as those based on cadmium indium selenide (CIS), and ~22.1% for the perovskite solar cells—which are most commonly based on lead (Pb) salts.

Figure 4:
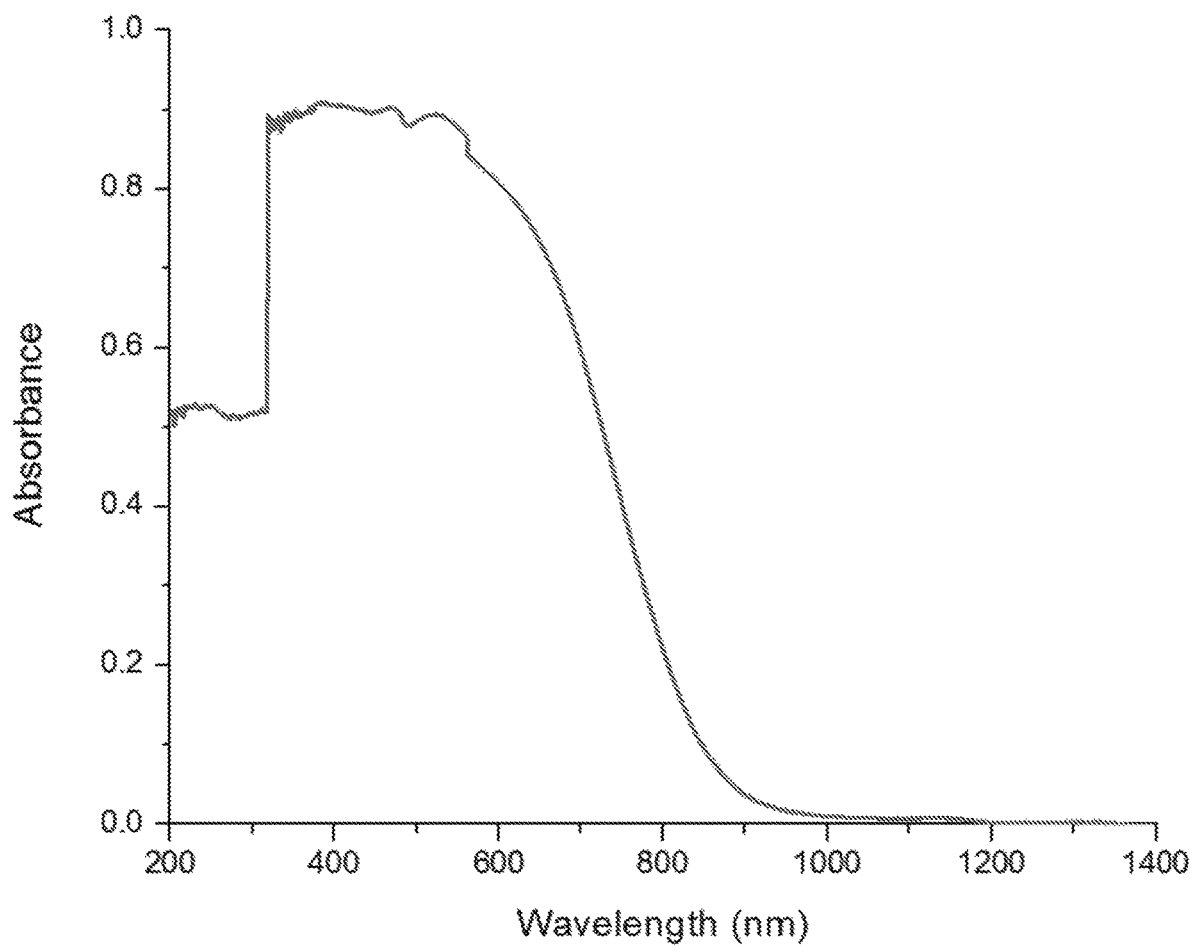
FIG. 4 depicts the solid state absorption spectrum of poly-$[Cu(PAP)_4][BF_4^-]$—.
Figure 5:
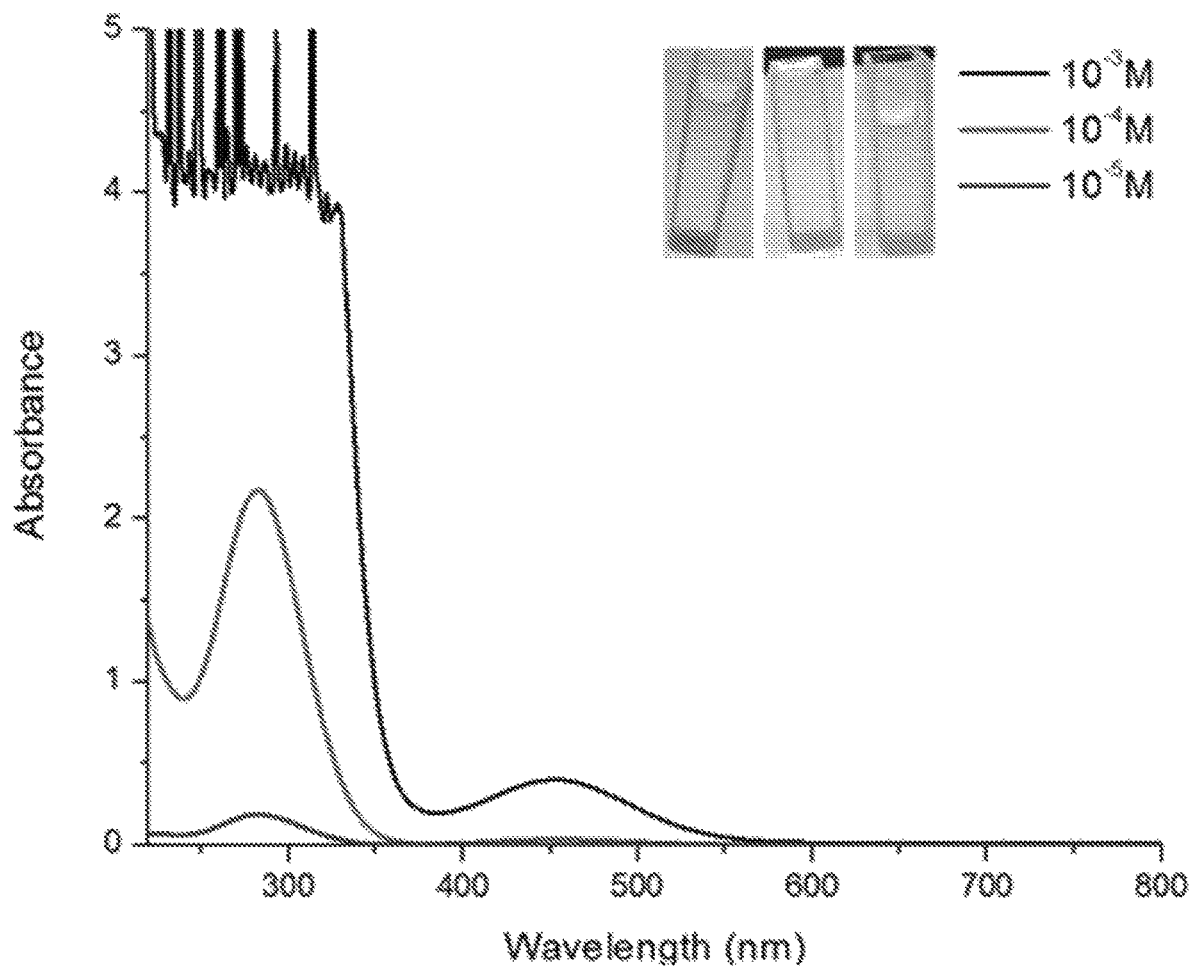
FIG. 5 depicts absorption spectra for different concentrations of poly-$[Cu(PAP)_4][BF_4^-]$— in acetonitrile.

Absorption Properties of poly-[Cu(PAP)$_4$][BF$_4^-$]— Ionic Coordination Polymer FIG. 4 depicts the solid state absorption spectrum of poly-[Cu(PAP)$_4$][BF$_4^-$]—. FIG. 5 depicts absorption spectra for different concentrations of poly-[Cu(PAP)$_4$][BF$_4^-$]— in acetonitrile.

Figure 6:
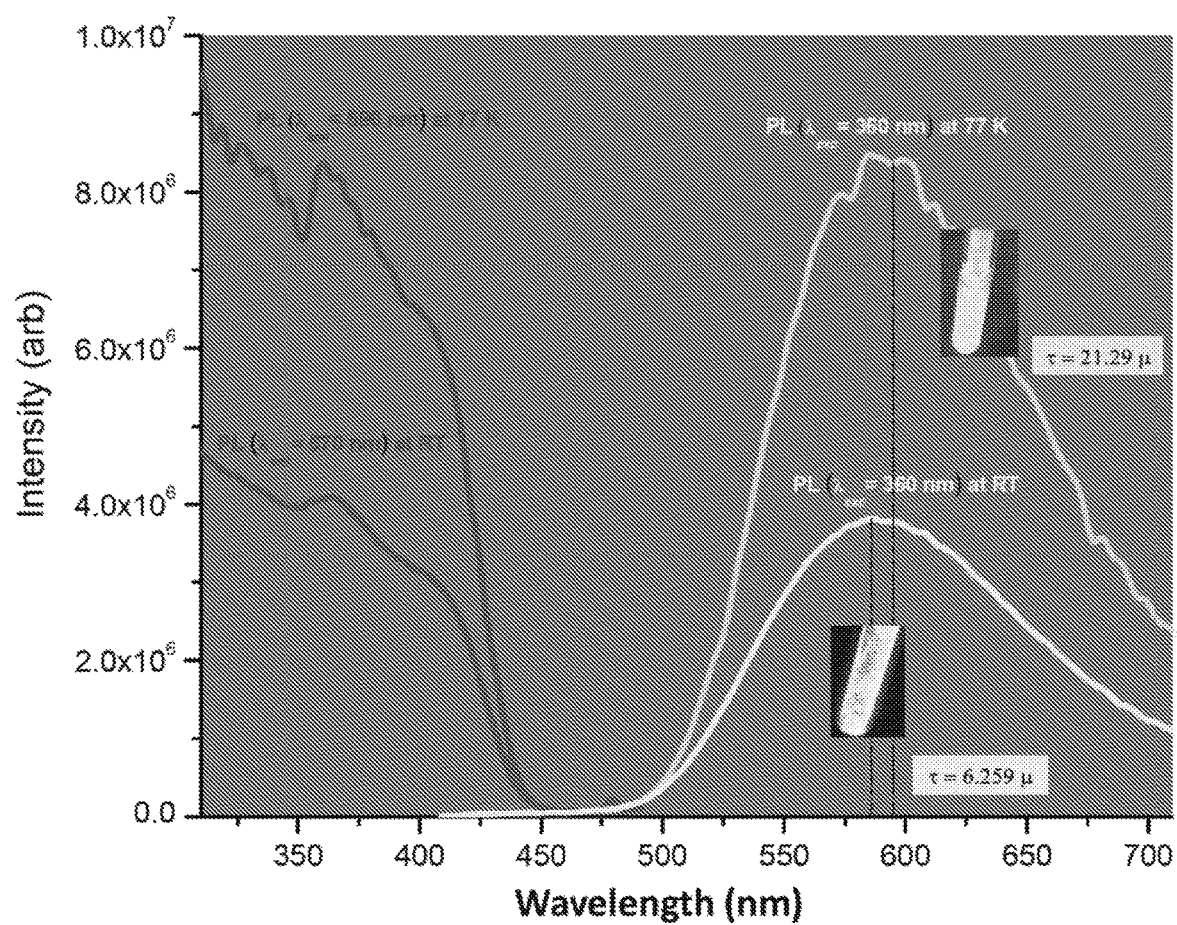
FIG. 6 depicts the photoluminescence (PL) and PL excitation (PLE) spectra of the poly—$[Cu(1,2-bis(4-pyridyl)ethane)_4][BF_4^-]$— at 298 K (RT) and 77 K.
Figure 7:
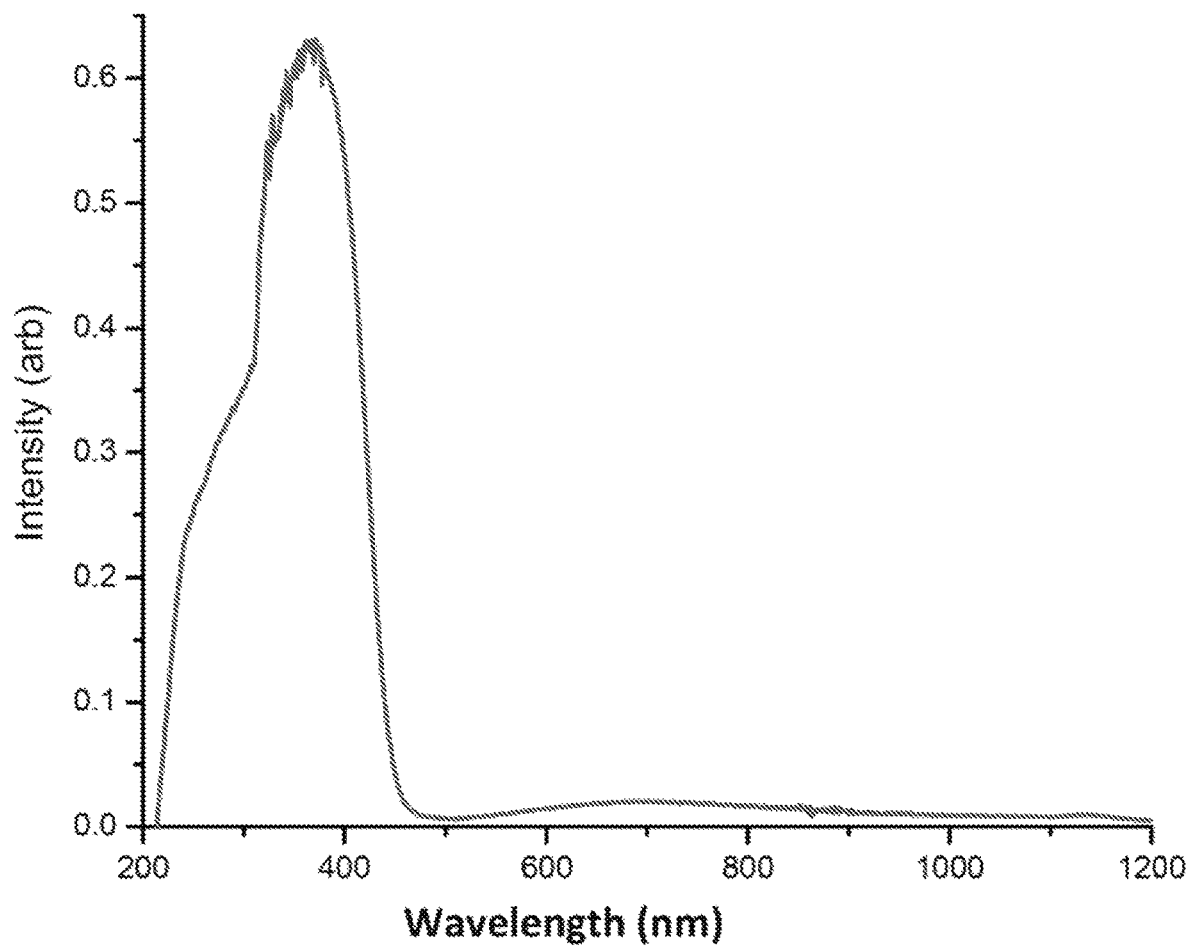
FIG. 7 depicts the solid state absorption spectrum of poly-$[Cu(1,2-bis(4-pyridyl)ethane)_4][BF_4^-]$—.

Absorption Properties of poly-[Cu(1,2-bis(4-pyridyl)ethane)$_4$][BF$_4^-$]— Ionic Coordination Polymer FIG. 6 depicts the photoluminescence (PL) and PL excitation (PLE) spectra of the poly-[Cu(1,2-bis(4-pyridyl)ethane)$_4$][BF$_4^-$]— at 298 K (RT) and 77 K. FIG. 7 depicts solid state absorption spectrum of the poly-[Cu(1,2-bis(4-pyridyl)ethane)$_4$][BF$_4$].

C. Material Properties

Figure 8:
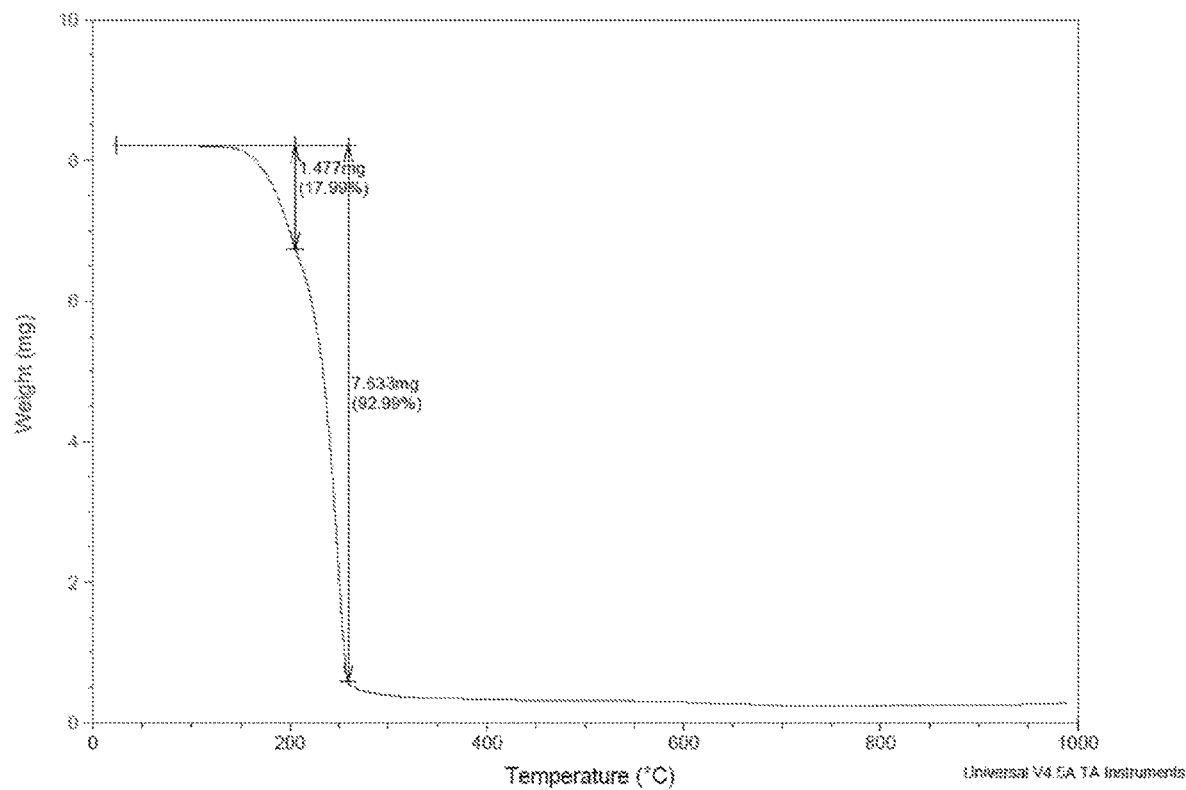
FIG. 8 depicts a TGA profile for poly-$(PAP_3\{[3,5-(CF_3)_2Pz]Cu\}_2)$—.
Figure 9A:
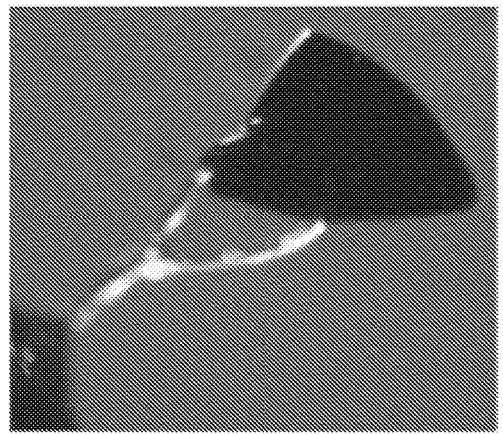
FIG. 9A depicts a photograph of a large single crystal of poly-$(PAP_3\{[3,5-(CF_3)_2Pz]Cu\}_2)$—.
Figure 9B:
FIG. 9B depicts a photograph of a thin film, of poly-$(PAP_3\{[3,5-(CF_3)_2Pz]Cu\}_2)$—.

FIG. 8 shows the thermogravimetric analysis (TGA) profile for poly-(PAP$_3$\{[3,5-(CF$_3$)$_2$Pz]Cu\}$_2$)— to illustrate the thermal stability of the material. FIGS. 9A and 9B show two solid-state forms of the material (poly-(PAP$_3$\{[3,5-(CF$_3$)$_2$Pz]Cu\}$_2$)—) that are conducive for device use, a large single crystal plate (akin to those used for Si chips in the microelectronics industry) is shown in FIG. 9A and a thin film form (akin to those used in nanoscale organic electronic devices, such as OLEDs and OPVs) is shown in FIG. 9B. The large single crystal form can be used either as is, akin to single-crystal based organic electronic devices, or by slicing it into wafers akin to those used for Si chips in the microelectronics industry.

Preliminary solar cell device testing results on poly-(PAP$_3$\{[3,5-(CF$_3$)$_2$Pz]Cu\}$_2$)— have shown that only the neat solid form produces a photocurrent, whereas doped solid forms do not (besides that of the host matrix). Thus, the uses of this and other embodiments in this class of coordination polymer materials in solar cell devices shall focus on neat solid forms such as neat thin films and single crystals.

D. Structural Properties

Figure 10A:
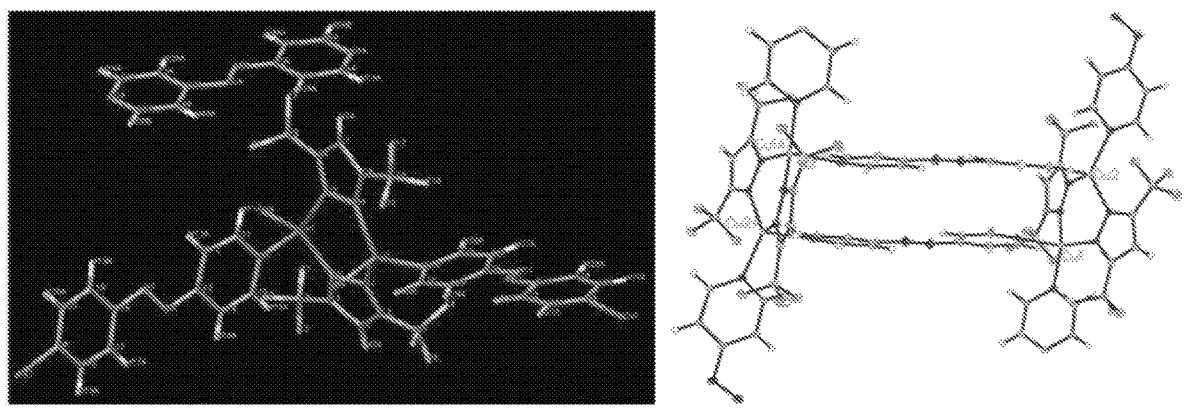
FIG. 10A depicts the structure of the repeat units in the crystal structure of poly-$(PAP_3\{[3,5-(CF_3)_2Pz]Cu\}_2)$—.
Figure 10B:
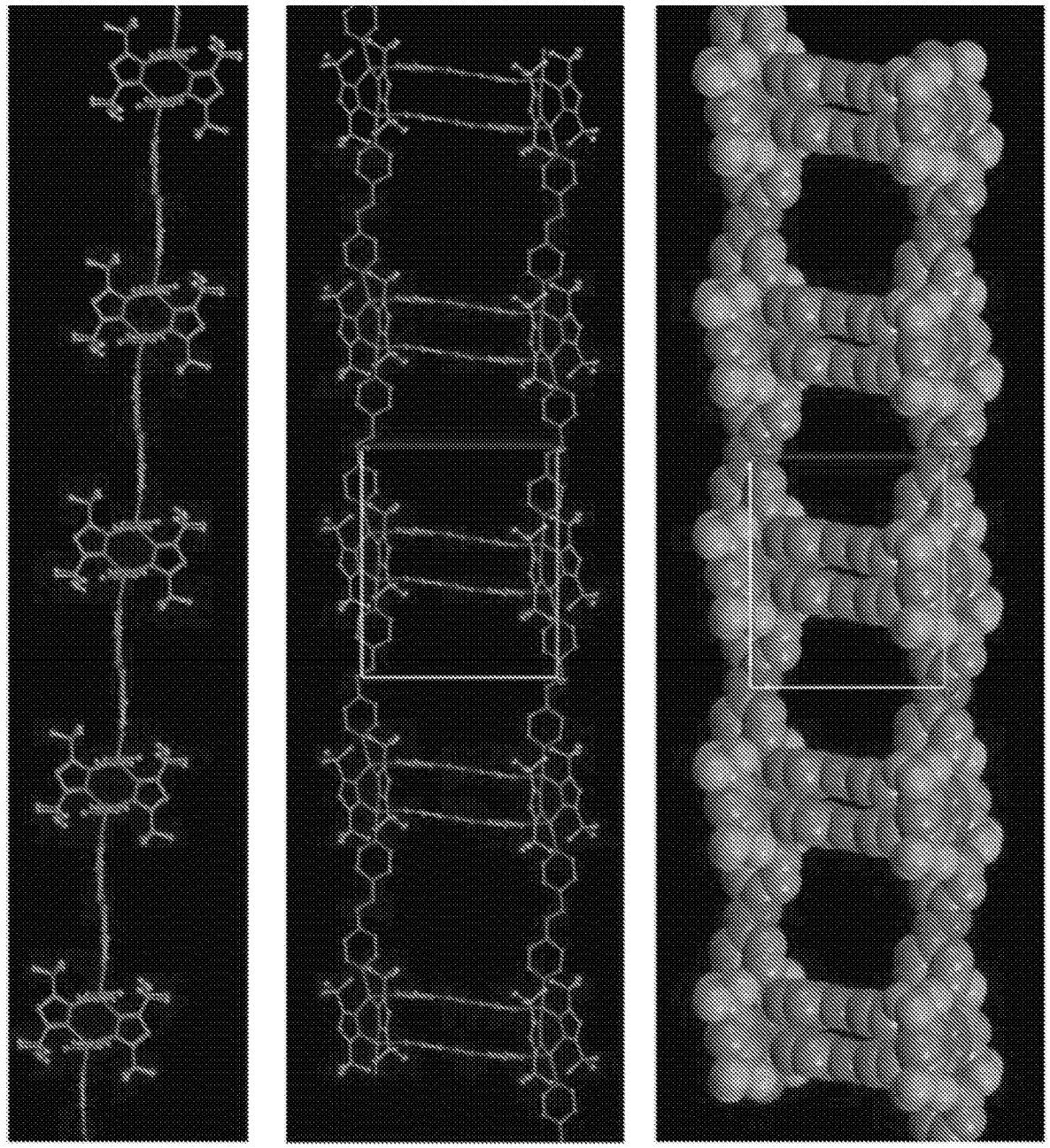
FIG. 10B depicts three views of the ladder structure of poly-$(PAP_3\{[3,5-(CF_3)_2Pz]Cu\}_2)$— without the free, uncoordinated, PAP ligand molecules.
Figure 11:
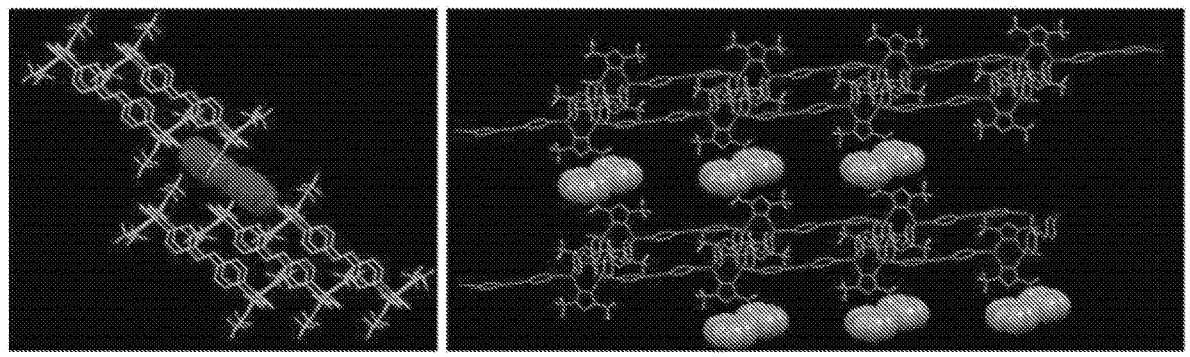
FIG. 11 depicts two views of the ladder structure of poly-$(PAP_3\{[3,5-(CF_3)_2Pz]Cu\}_2)$— with the free, uncoordinated, PAP ligand molecules occupying lattice sites between adjacent ladders.

FIGS. 10-11 show multiple views of the X-ray crystal structure of poly-(PAP$_3$\{[3,5-(CF$_3$)$_2$Pz]Cu\}$_2$)—, while Table 1 shows the unit cell data. FIG. 10A depicts the structure of the repeat units in the crystal structure of poly-(PAP$_3$\{[3,5-(CF$_3$)$_2$Pz]Cu\}$_2$)—. FIG. 10B depicts three views of the ladder structure of poly-(PAP$_3$\{[3,5-(CF$_3$)$_2$Pz]Cu\}$_2$)— without the free, uncoordinated, PAP ligand molecules. FIG. 11 depicts two views of the ladder structure of poly-(PAP$_3$\{[3,5-(CF$_3$)$_2$Pz]Cu\}$_2$)— with the free, uncoordinated, PAP ligand molecules occupying lattice sites between adjacent ladders. These data clearly illustrate the 1D and 2D conjugation of the chromophoric components, which is responsible for the aforementioned conducting and absorption properties for their corresponding solids.

Figure 12:
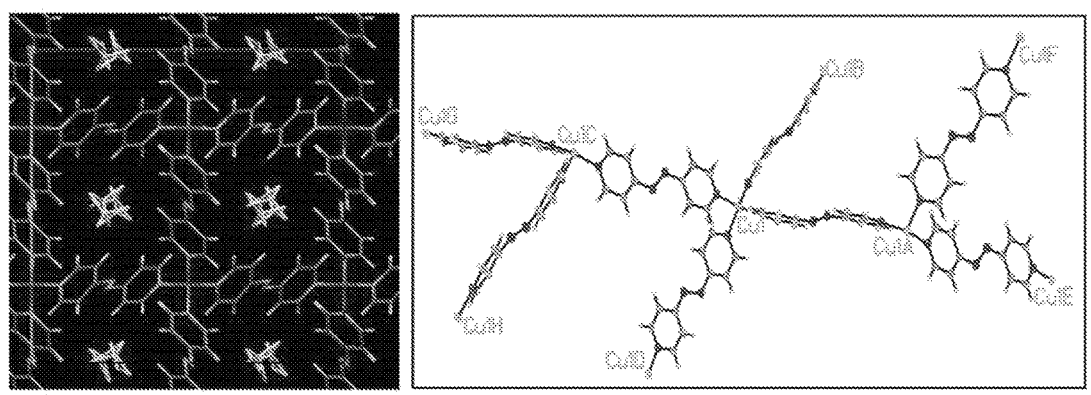
FIG. 12 depicts an X-ray structure of the repeat units in the crystal structure of poly-$[Cu(PAP)_4][BF_4^-]$—.

FIG. 12 depicts an X-ray structure of the repeat units in the crystal structure of poly-[Cu(PAP)$_4$][BF$_4^-$]—.

Figure 13:
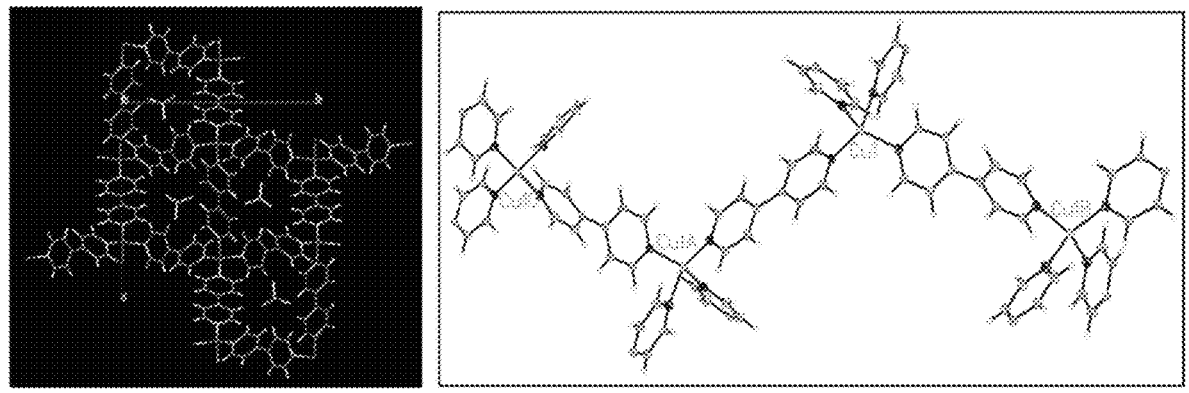
FIG. 13 depicts an X-ray structure of the repeat units in the crystal structure of poly-$[Cu(4,4'-bipyridine)_4][BF_4^-]$—.

FIG. 13 depicts an X-ray structure of the repeat units in the crystal structure of poly-[Cu(4,4'-bipyridine)$_4$][BF$_4^-$]—.

Figure 14A:
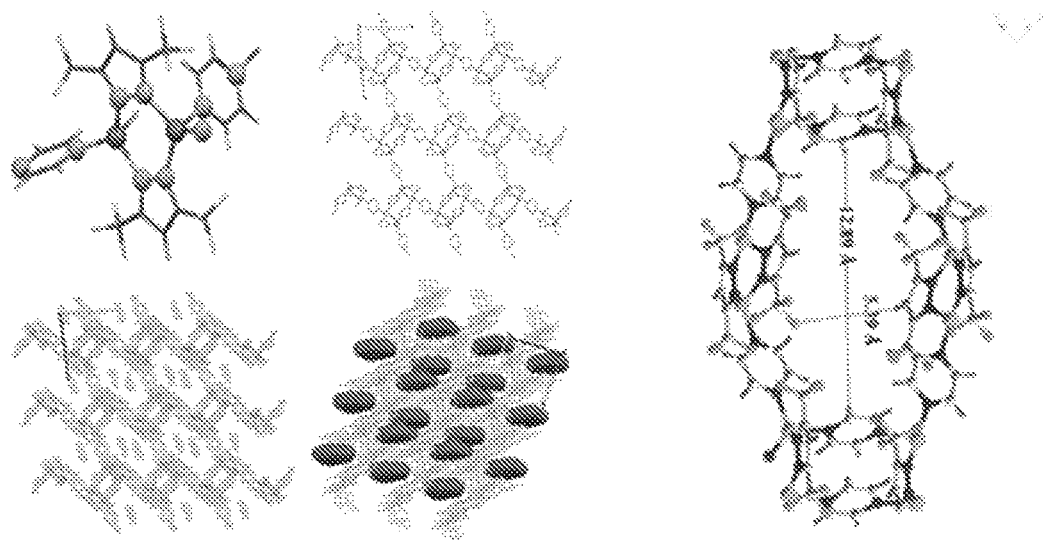
(FIG. 14A) Molecular, packing structures, and pore cross section of $\{Cu_2[3,5-(CF_3)_2Pz]\}_2(Pyz)_2 \cdot toluene\}_\infty$=MOF-TW1·toluene.
Figure 14B:
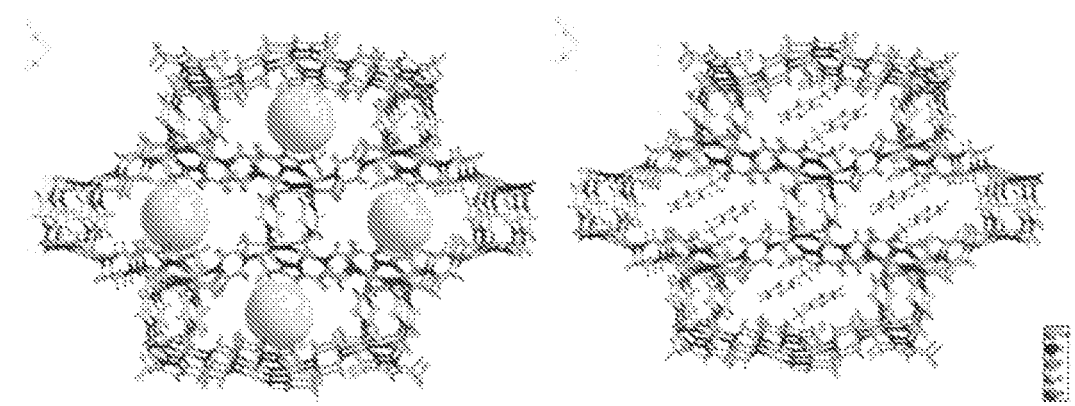
(FIG. 14B) Pore representation of solvent-accessible regions (yellow spheres in evacuated/left and toluene-occupied/right crystals) of MOF-TW1.

FIG. 14 depicts an X-ray structure of the metal-organic framework poly-(Pyz$_2$\{[3,5-(CF$_3$)$_2$Pz]Cu\}$_2$—i.e., complex 2=MOF-TW1 in Scheme 3 showing: (a) Molecular, packing structures, and pore cross section of \{Cu$_2$[3,5-(CF$_3$)$_2$Pz]\}$_2$(Pyz)$_2$·toluene\}$_\infty$ (2·toluene=MOF-TW1·toluene). (b) Pore representation of solvent-accessible regions (yellow spheres in evacuated/left and toluene-occupied/right crystals) of MOF-TW1. The pore characteristics of toluene-free cavities include the following features:

i) Total potential solvent-accessible volume is 416.4 Å$^3$, representing 27.10% of the 1535.05(13) Å$^3$ unit cell volume, as calculated by Platon.

ii) Surface area=1278 m$^2$/g, as calculated by Materials Studio.

iii) Pore size of ~13.9 Å×5.4 Å, as measured by Mercury, corresponding to the dimensions of the parallelogram-shaped channel cross sections (as shown in FIG. 14a, whereas the yellow spheres in FIG. 14b exhibit a diameter that corresponds to the 5.4 Å shorter distance)

TABLE 1

Crystal data and structure refinement for poly-(PAP$_3$\{[3,5-(CF$_3$)$_2$Pz]Cu\}$_2$)—

| | |
|---|---|
| Empirical formula | C$_{35}$H$_{22}$Cu$_2$F$_{12}$N$_{14}$ |
| Formula weight | 993.75 |
| Temperature | 100(2)K |
| Wavelength | 0.71073 Å |
| Crystal system | Monoclinic |
| Space group | P 21/c |
| Unit cell dimensions | a = 17.2721(12) Å   α = 90° |
| | b = 16.2368(12) Å   β = 105.2370(10)° |
| | c = 14.1727(10) Å   γ = 90° |

TABLE 1-continued

Crystal data and structure refinement for poly-(PAP$_3${[3,5-(CF$_3$)$_2$Pz]Cu}$_2$)—

| | |
|---|---|
| Volume | 3834.9(5) Å$^3$ |
| Z | 4 |
| Density (calculated) | 1.721 Mg/m$^3$ |
| Absorption coefficient | 1.217 mm$^{-1}$ |
| F(000) | 1984 |
| Crystal size | 0.31 × 0.27 × 0.06 mm$^3$ |
| Theta range for data collection | 1.75 to 27.12° |
| Index ranges | −22 <= h <= 22, −20 <= k <= 20, −18 <= l <= 18 |
| Reflections collected | 51407 |
| Independent reflections | 8459 [R(int) = 0.0316] |
| Completeness to theta = 27.12° | 99.7% |
| Absorption correction | Semi-empirical from equivalents |
| Max. and min. transmission | 0.9350 and 0.7071 |
| Refinement method | Full-matrix least-squares on F2 |
| Data/restraints/parameters | 8459/0/568 |
| Goodness-of-fit on F$^2$ | 1.021 |
| Final R indices [I > 2sigma(I)] | R1 = 0.0287, wR2 = 0.0749 |
| R indices (all data) | R1 = 0.0343, wR2 = 0.0785 |
| Largest diff. peak and hole | 2.305 and −0.636 e.Å$^{-3}$ |

$R_1 = \Sigma ||F_o| - |F_c|| / \Sigma |F_o|$; $wR_2 = \{\Sigma[w(F_o^2 - wF_c^2)^2 / \Sigma[w(f_o^2)^2]\}^{1/2}$

TABLE 2

Crystal data and structure refinement for poly-[Cu(PAP)$_4$][BF$_4^-$]—

| | |
|---|---|
| Empirical formula | C$_{40}$H$_{32}$B$_8$Cu$_2$F$_{16}$N$_{16}$ |
| Formula weight | 1254.38 |
| Temperature | 220(2)K |
| Wavelength | 0.71073 Å |
| Crystal system | Tetragonal |
| Space group | I 4 1/a |
| Unit cell dimensions | a = 17.402(3) Å   α = 90° |
| | b = 17.402(3) Å   β = 90° |
| | c = 7.6865(12) Å  γ = 90° |
| Volume | 2327.6(6) Å$^3$ |
| Z | 2 |
| Density (calculated) | 1.790 Mg/m$^3$ |
| Absorption coefficient | 1.034 mm$^{-1}$ |
| F(000) | 1252 |
| Crystal size | 0.26 × 0.25 × 0.16 mm$^3$ |
| Theta range for data collection | 2.90 to 27.09°. |
| Index ranges | −22 <= h <= 22, −22 <= k <= 22, −9 <= l <= 9 |

TABLE 2-continued

Crystal data and structure refinement for poly-[Cu(PAP)$_4$][BF$_4^-$]—

| | |
|---|---|
| Reflections collected | 15262 |
| Independent reflections | 1280 [R(int) = 0.0223] |
| Completeness to theta = 27.09° | 99.8% |
| Absorption correction | Semi-empirical from equivalents |
| Max. and min. transmission | 0.8521 and 0.7770 |
| Refinement method | Full-matrix least-squares on F2 |
| Data/restraints/parameters | 1280/2/93 |
| Goodness-of-fit on F$^2$ | 1.026 |
| Final R indices [I > 2sigma(I)] | R1 = 0.0474, wR2 = 0.1327 |
| R indices (all data) | R1 = 0.0487, wR2 = 0.1346 |
| Largest diff. peak and hole | 0.290 and −0.547 e.Å$^{-3}$ |

TABLE 3

Crystal data and structure refinement for poly-[Cu(4,4'-bipyradine)$_4$][BF$_4^-$]—

| | |
|---|---|
| Empirical formula | C$_{20}$H$_{16}$BCuF$_4$N$_4$ |
| Formula weight | 462.72 |
| Temperature | 220(2)K |
| Wavelength | 0.71073 Å |
| Crystal system | Monoclinic |
| Space group | P 21/c |
| Unit cell dimensions | a = 7.1238(3) Å   α = 90° |
| | b = 16.3335(7) Å  β = 100.469(2)° |
| | c = 17.2929(8) Å  γ = 90° |
| Volume | 1978.65(15) Å3 |
| Z | 4 |
| Density (calculated) | 1.553 Mg/m$^3$ |
| Absorption coefficient | 1.155 mm$^{-1}$ |
| F(000) | 936 |
| Crystal size | 0.17 × 0.05 × 0.03 mm$^3$ |
| Theta range for data collection | 1.73 to 27.10° |
| Index ranges | −9 <= h <= 8, −20 <= k <= 20, −22 <= l <= 22 |
| Reflections collected | 30862 |
| Independent reflections | 4358 [R(int) = 0.0533] |
| Completeness to theta = 27.10° | 99.9% |
| Absorption correction | Semi-empirical from equivalents |
| Max. and min. transmission | 0.9629 and 0.8235 |
| Refinement method | Full-matrix least-squares on F2 |
| Data/restraints/parameters | 4358/0/271 |
| Goodness-of-fit on F2 | 1.027 |
| Final R indices [I > 2sigma(I)] | R1 = 0.0580, wR2 = 0.1449 |
| R indices (all data) | R1 = 0.0803, wR2 = 0.1567 |
| Largest diff. peak and hole | 0.779 and −0.500 e.Å$^{-3}$ |

TABLE 4

Crystallographic data for complexes 1-6 shown in Schemes 3-5.

| Complex | [1]•CH$_2$Cl$_2$ | [2]•toluene | [3]•1.5benzene | [4]•2benzene | [5] | [6] |
|---|---|---|---|---|---|---|
| CCDC | 1821487 | 1821694 | 1821488 | 1821489 | 1821705 | 1821704 |
| Crystal system | Triclinic | Triclinic | Triclinic | Triclinic | Monoclinic | Orthorhombic |
| Formula | C$_{43}$H$_{20}$Cl$_2$Cu$_6$F$_{36}$N$_{18}$ | C$_{25}$H$_{18}$Cu$_2$F$_{12}$N$_8$ | C$_{30}$H$_{18}$Cu$_3$F$_{18}$N$_9$ | C$_{50}$H$_{26}$Ag$_6$F$_{36}$N$_{16}$ | C$_{14}$H$_{12}$Ag$_2$F$_{12}$N$_6$ | C$_8$H$_{10}$BCuF$_4$N$_4$ |
| Formula weight | 1924.91 | 785.55 | 1037.15 | 2182.09 | 708.04 | 312.55 |
| Space group | P$\bar{1}$ | P$\bar{1}$ | P$\bar{1}$ | P$\bar{1}$ | C$_{2/c}$ | P$_{bca}$ |
| a, (Å) | 11.023(5) | 9.8425(5) | 11.9433(6) | 10.537(4) | 15.056(2) | 10.709(2) |
| b, (Å) | 11.174(5) | 12.2763(6) | 13.2270 (6) | 11.355(4) | 27.738(3) | 10.614(2) |
| c, (Å) | 14.641(11) | 13.2130(6) | 15.0253 (11) | 15.527(5) | 12.0564(14) | 22.430(4) |
| α, (deg) | 103.763(12) | 83.306(1) | 98.870(1) | 98.364(5) | 90 | 90 |
| β, (deg) | 104.969(11) | 85.895(1) | 108.650(1) | 105.997(5) | 121.855(2) | 90 |
| γ, (deg) | 106.907(8) | 75.710(1) | 116.392(1) | 106.056(5) | 90 | 90 |
| V, (Å$^3$) | 1568.2(16) | 1535.05(13) | 1887.8(2) | 1666.0(9) | 4276.8(9) | 2549.6(7) |
| Z | 1 | 2 | 2 | 1 | 8 | 8 |
| T, (K) | 100(2) | 200(2) | 200(2) | 200(2) | 100(2) | 220(2) |
| λ, (Å) | 0.71073 | 0.71073 | 0.71073 | 0.71073 | 0.71073 | 0.71073 |
| ρ$_{calcd}$, (Mg/m$^3$) | 2.028 | 1.700 | 1.825 | 2.175 | 2.199 | 1.629 |

TABLE 4-continued

Crystallographic data for complexes 1-6 shown in Schemes 3-5.

| Complex | [1]•CH$_2$Cl$_2$ | [2]•toluene | [3]•1.5benzene | [4]•2benzene | [5] | [6] |
|---|---|---|---|---|---|---|
| $\mu$, (mm$^{-1}$) | 2.241 | 1.490 | 1.801 | 1.880 | 1.950 | 1.748 |
| Crystal size, (mm$^3$) | 0.20 × 0.08 × 0.08 | 0.22 × 0.14 × 0.03 | 0.36 × 0.23 × 0.11 | 0.32 × 0.13 × 0.12 | 0.21 × 0.20 × 0.07 | 0.12 × 0.10 × 0.09 |
| Absorption correction | multi-scan | multi-scan | multi-scan | multi-scan | multi-scan | multi-scan |
| Abs. Corr. factor | 0.8446/0.6590 | 0.9637/0.7343 | 0.8293/0.5641 | 0.8045/0.5837 | 0.8837/0.6883 | 0.8530/0.8151 |
| Total reflections | 14320 | 15834 | 25717 | 15589 | 28523 | 25124 |
| Independ. Reflections | 6247 | 6782 | 8298 | 7118 | 4718 | 2747 |
| Data/res/parameters | 6247/0/484 | 6782/0/425 | 8298/0/541 | 7118/9/503 | 4718/0/315 | 2747/0/165 |
| R$_1$ [I > 2$\sigma$(I)] | 0.0365 | 0.0343 | 0.0424 | 0.0649 | 0.0201 | 0.0258 |
| wR2 [I > 2$\sigma$(I)] | 0.0940 | 0.0873 | 0.1199 | 0.1590 | 0.0601 | 0.0757 |
| R$_1$ (all data) | 0.0475 | 0.0494 | 0.0531 | 0.0898 | 0.0220 | 0.0353 |
| wR$_2$ (all data | 0.1022 | 0.0950 | 0.1291 | 0.1831 | 0.0621 | 0.0820 |
| GOF on F$^2$ | 1.043 | 1.032 | 1.032 | 1.032 | 1.023 | 1.028 |
| $\Delta\rho$(max), $\Delta\rho$(min) (e/Å$^3$) | 1.338, −1.351 | 0.517, −0.489 | 1.005, −0.639 | 1.805, −1.822 | 1.064, −0.679 | 0.239, −0.389 |

E. Theoretical Manifestation of Optoelectronic Properties

Figure 16:
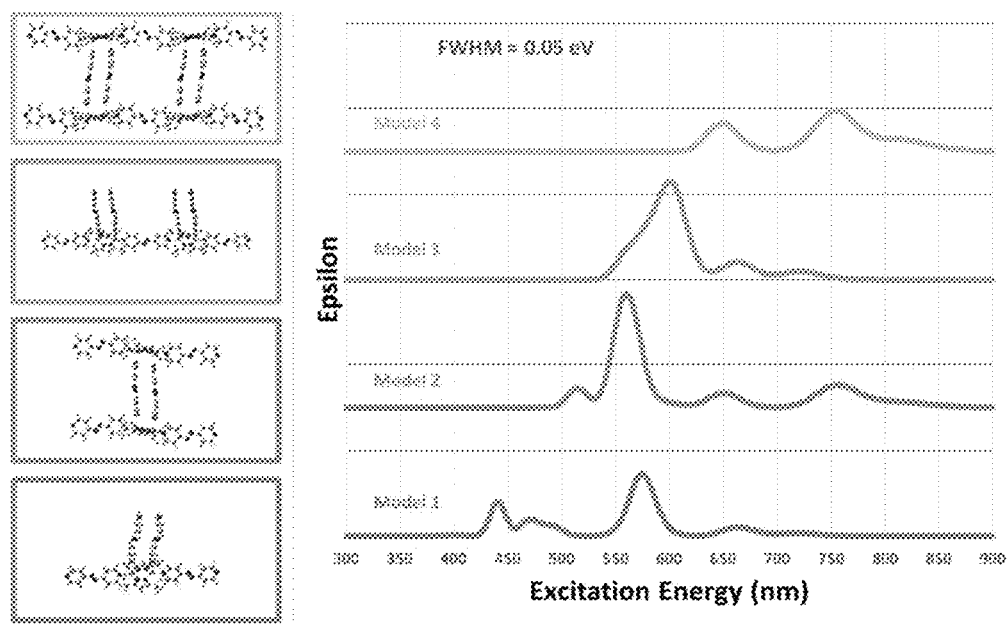
FIG. 16 depicts an illustration of the red-shift in UV/Vis absorption bands as the structural components in poly-$(PAP_3\{[3,5-(CF_3)_2Pz]Cu\}_2)$— become more conjugated.
Figure 15A:
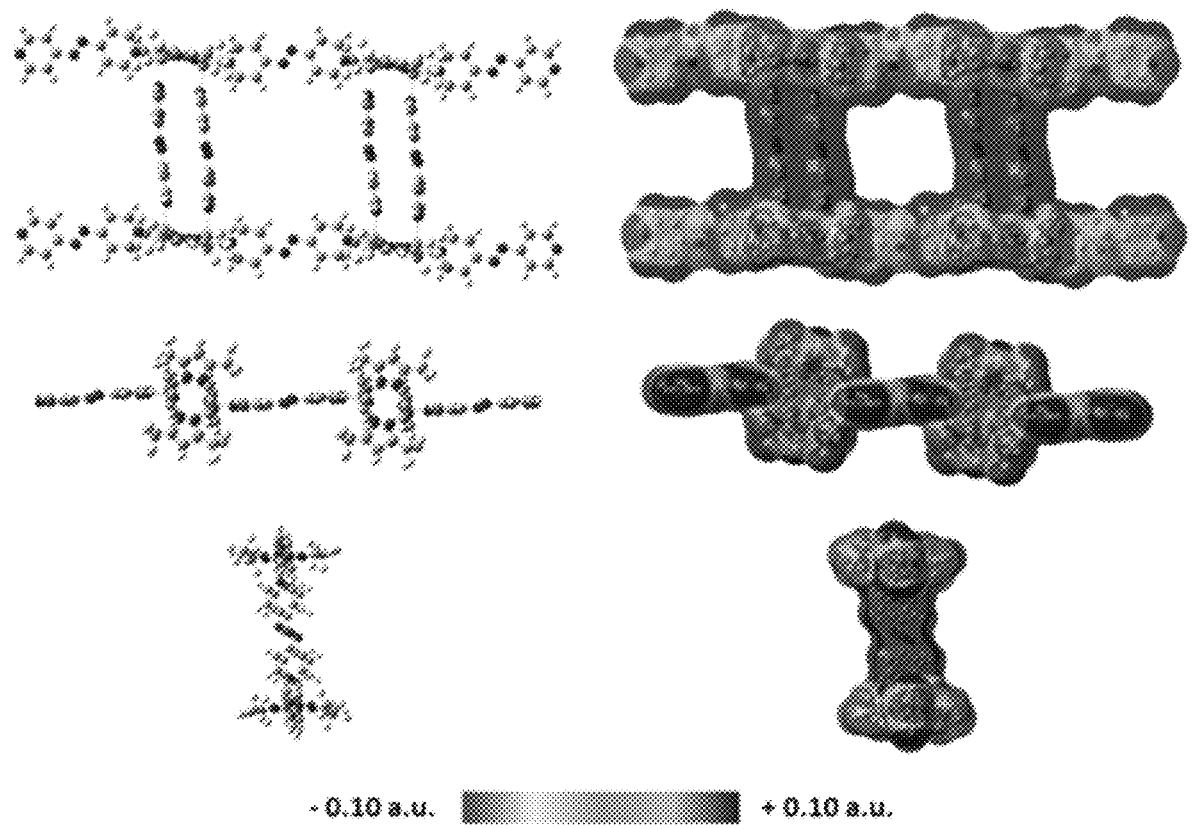
FIG. 15A depicts molecular electrostatic potential (MEP) for molecular structure units in poly-$(PAP_3\{[3,5-(CF_3)_2Pz]Cu\}_2)$—.
Figure 15B:
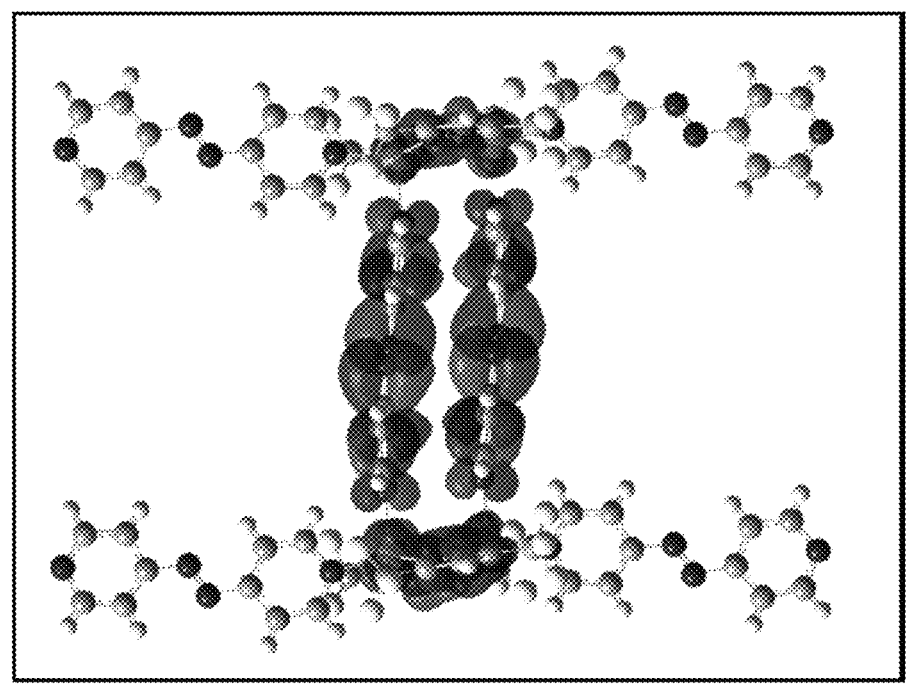
FIG. 15B depicts selected frontier molecular orbital contours for molecular structure units in poly-$(PAP_3\{[3,5-(CF_3)_2Pz]Cu\}_2)$—.

FIGS. 15 and 16 show computational data that substantiate the optoelectronic properties upon extended conjugation in for poly-(PAP$_3${[3,5-(CF$_3$)$_2$Pz]Cu}$_2$)—. Thus, as the structural components become more conjugated, the conductivity increases for electrons and holes—blue and red parts, respectively, in FIG. 15A—as well as excitons—FIG. 15B—while the absorption bands red-shift FIG. 16.

Figure 17A:
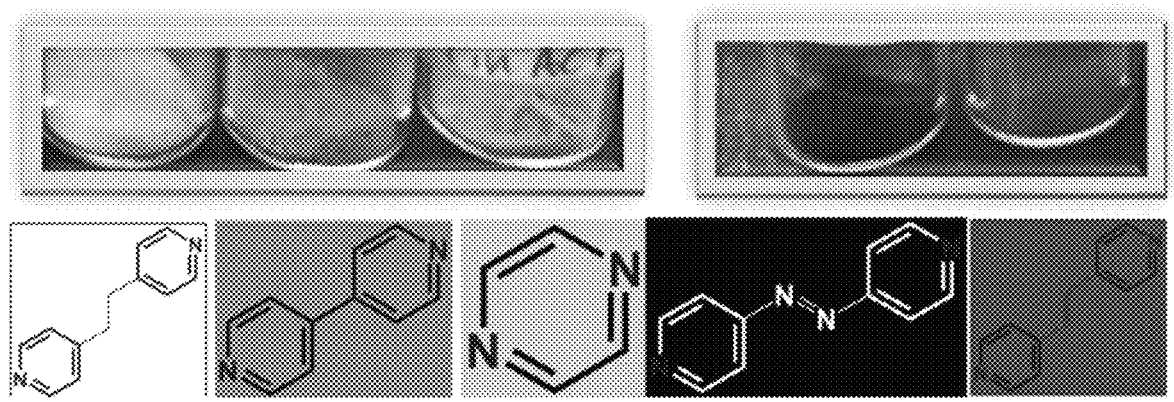
FIG. 17A depicts photographs of colored solids and chemical structures of each ionic functional coordination polymer with $X_1^{\frown\frown\frown}Y_1=X_2^{\frown\frown\frown}Y_2$ ligand=from left to right=bpa, 4,4'-bipyridine, 1,4-pyrazine, PAP, and bpe, respectively.
Figure 17B:
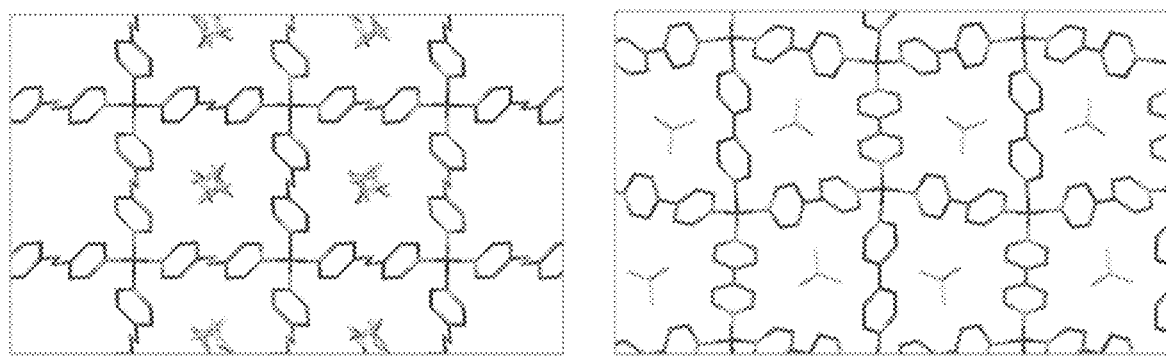
FIG. 17B depicts two representative crystal structures for the ionic functional coordination polymers with $X_1^{\frown\frown\frown}Y_1=X_2^{\frown\frown\frown}Y_2$=PAP (left) and 4,4'-bipyridine (right) with tunable pore size indicated by the guest-accessible pore volume and void % of unit cell for each.
Figure 17C:
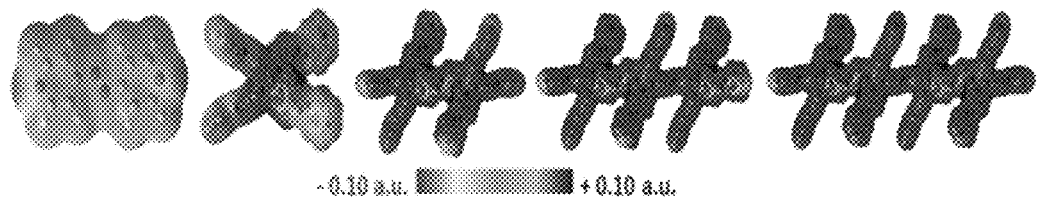
FIG. 17C depicts DFT simulations of the molecular electrostatic potential (MEP) on crystal structure moieties of the ionic functional coordination polymer with $X_1\text{\textasciicircum\textasciicircum\textasciicircum}Y_1=X_2\text{\textasciicircum\textasciicircum\textasciicircum}Y_2=$PAP vs. its free organic ligand.

Members of this series of functional coordination polymers with tetrahedral building blocks corresponding to those shown in Scheme 2(a) and 2(b) above for neutral and ionic functional coordination polymers, respectively. We have synthesized a series of exemplary embodiments for the ionic functional coordination polymers of Scheme 2(b) above, whereby M$_1$=M$_2$=Cu(I); n1=n2=4, Z1=Z2=[BF4]$^−$, n3=n4=1, and whereby X$_1$⁀⁀⁀Y$_1$=X$_2$⁀⁀⁀Y$_2$=the bridging diimine linkers being the "back-to-back" diimine bridging ligands shown in FIG. 15A, namely—from left to right=1,2-bis(4-pyridyl)ethane, 4,4'-bipyridine, 1,4-pyrazine, PAP, or 1,2-bis(4-pyridyl)ethylene, respectively. FIG. 17A also shows photographs of the colored solids obtained for member of this series. Remarkably, the visible colors are obtained for such solids although the absorption maximum of both the ligands and the d$^{10}$ metal ion are in the UV region. The observation of visible colors in these preferred ionic functional coordination polymer embodiments, therefore, represent an inorganic structural analogy to the structure of vegetables such as carrots and tomatoes whose colors are exhibited due to oligomeric conjugation of the far-UV-absorbing ethylene moieties, shifting $\lambda_{max}$ from 190 nm to ~450 and 500 nm, respectively, due to the 11 and 13 conjugated double bonds in β-carotene and lycopene, respectively. This series' members, likewise, exhibit conjugation of stronger (aromatic) chromophores than ethylene in an extended infinite matter (as opposed to merely oligomeric) across the four directions of the tetrahedral arms of the Cu(I) centers. The degree of red shift into the visible region depends on the size of the chromophoric aromatic ligands that are conjugated indefinitely to one another through the d$^{10}$ metal center; an extreme situation leads, most remarkable, to a black absorber in the preferred embodiment with X$_1$⁀⁀⁀Y$_1$=X$_2$⁀⁀⁀Y$_2$=PAP, which exhibits continuous absorption of all visible and UV wavelengths of the solar spectrum and a broad region of the near-IR portion, e.g., 900 nm. In another extreme, when the chromophoric diamine ligand has a saturated moiety separating its two pyridyl aromatic rings, which is the case in the preferred embodiment with X$_1$⁀⁀⁀Y$_1$=X$_2$⁀⁀⁀Y$_2$=1,2-bis(4-pyridyl)ethane, the conjugation is broken and a faint-yellow solid form for that coordination polymer, which then exhibits a different set of functional properties including bright luminescence with near-UV excitation (instead of strong visible absorptions) and reduced electronic conductivity desired for supercapacitors and battery compositions. These are examples of other functional material properties for this ionic functional coordination polymer family, which include not only being potential candidates for (a) "black absorbers" for photovoltaic or other electronic device applications in view of the properties illustrated in FIGS. 17A, and 17B selective guest adsorption due to their tunable porosity depending upon the size of the ligand—FIG. 16B—but also concomitant (c) light-emitting diode (LED) applications due to their bright luminescence, and (d) battery/supercapacitor applications in part due to the low electrical conductivity yet high ionic conductivity because the disordered BF$_4$$^−$ ions that fill the pores of the cationic metal-organic frameworks are essentially unbound, hence they are expected to exhibit extremely high ionic mobility. Battery applications, for example, will be pursued for further modifications of such ionic functional coordination polymers whereby the BF$_4$$^−$ counterions are exchanged with smaller F$^−$ and/or ubiquitous Cl$^−$ anions for potential next-generation batteries that may not be as flammable as lithium ion batteries. The MEP pictures in FIG. 17C from DFT simulations of crystal structure moieties of the ionic functional coordination polymer with X$_1$⁀⁀⁀Y$_1$=X$_2$⁀⁀⁀Y$_2$=PAP vs. its free organic ligand illustrate the increased propagation of polarons upon proceeding from the uncoordinated organic ligand molecule to the extended solid-state structure—which is deduced by contrasting the more "green" or less "blue"/less positive MEP magnitude for the ligand in comparison with the situation upon increased conjugation with metal-ligand molecular units in FIG. 17C—which is promising for the highly-coveted n-type (electrontransporting) semiconducting behavior in organic electronic devices.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A coordination polymer comprising a polymer having repeat units of a structure (I):

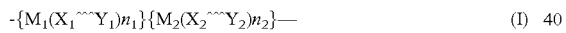
(I)

where:
$M_1$ is gold and $M_2$ is, independently, copper, silver, or gold;
$X_1$, $X_2$, $Y_1$, and $Y_2$ are each, independently N, O, P, or S;
each $\frown$ represents, independently, an alkyl or aryl hydrocarbon group linking the respective groups $X_1/Y_1$ and $X_2/Y_2$ together; and
$n_1+n_2$=the coordination number of $M_1$+the coordination number of $M_2$.

2. The coordination polymer of claim 1, wherein $M_2$ is independently selected from the group consisting of: Cu(I), Cu(II), Ag(I), Au(I), and Au(III).

3. The coordination polymer of claim 1, wherein $M_2$ is Cu(I), and wherein each of $X_1$, $X_2$, $Y_1$, and $Y_2$ are nitrogen.

4. The coordination polymer of claim 1, wherein at least one of the compounds $(X_1\frown Y_1)$ or $(X_2\frown Y_2)$ is a heterocycle compound having at least two heteroatoms.

5. The coordination polymer of claim 1, wherein the at least one of the compounds $(X_1\frown Y_1)$ or $(X_2\frown Y_2)$ is selected from the group consisting of a pyrazolate, a substituted pyrazolate, pyrazine, a substituted pyrazine, an alkyl diamine, an alkylene diamine, a polyalkylene polyamine, a polyimine, bispyridine, and a substituted bispyridine.

6. The coordination polymer of claim 5, wherein the at least one of the compounds $(X_1\frown Y_1)$ or $(X_2\frown Y_2)$ is a pyrazolate having the structure (V):

(V)

where each of $R^3$, $R^4$, and $R^5$ is independently alkyl, halogenated alkyl, phenyl, or aryl;
where the dashed lines (-------) represent a bond to either $M_1$ or $M_2$.

7. A coordination polymer comprising a polymer having repeat units of a structure (I):

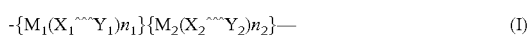
(I)

where:
$M_1$ and $M_2$ are each, independently, copper, silver, or gold;
$X_1$, $X_2$, $Y_1$, and $Y_2$ are each, independently N, O, P, or S;
each $\frown$ represents, independently, an alkyl or aryl hydrocarbon group linking the respective groups $X_1/Y_1$ and $X_2/Y_2$ together;
wherein a first compound of compounds $(X_1\frown Y_1)$ and $(X_2\frown Y_2)$ is a pyrazolate having the structure (V):

(V)

where each of $R^3$, $R^4$, and $R^5$ is independently alkyl, halogenated alkyl, phenyl, or aryl;
where the dashed lines (-------) represent a bond to either $M_1$ or $M_2$;
wherein a second compound of the compounds $(X_1\frown Y_1)$ and $(X_2\frown Y_2)$ is selected from the group consisting of an alkyl diamine, an alkylene diamine, a polyalkylene polyamine, a polyimine, a pyridine, a bispyridine, and a substituted bispyridine; and
$n_1+n_2$=the coordination number of $M_1$+the coordination number of $M_2$.

8. The coordination polymer of claim 7, wherein $M_1$ and/or $M_2$ are independently selected from the group consisting of: Cu(I), Cu(II), Ag(I), Au(I), and Au(III).

9. The coordination polymer of claim 7, wherein $M_1$ and/or $M_2$ is Cu(I) and wherein each of $X_1$, $X_2$, $Y_1$, and $Y_2$ are nitrogen.

* * * * *